US012677174B2

(12) United States Patent
Thiruchengode Vajravel et al.

(10) Patent No.: US 12,677,174 B2
(45) Date of Patent: Jul. 7, 2026

(54) SYSTEM AND METHOD FOR OPERATIVELY COUPLING PERIPHERAL DEVICES WITHIN A PERIPHERAL DEVICE WORKSPACE ACCORDING TO COMMUNICATION PROTOCOL BEST SUITED FOR DEVICE CAPABILITIES

(71) Applicant: Dell Products, LP, Round Rock, TX (US)

(72) Inventors: Gokul Thiruchengode Vajravel, Bangalore (IN); Srinivasa Ragavan Rajagopalan, Bangalore (IN); Vivek Viswanathan Iyer, Saint Johns, FL (US)

(73) Assignee: DELL PRODUCTS LP, Round Rock, TX (US)

( * ) Notice: Subject to any disclaimer, the term of this patent is extended or adjusted under 35 U.S.C. 154(b) by 350 days.

(21) Appl. No.: 18/429,863

(22) Filed: Feb. 1, 2024

(65) Prior Publication Data

US 2025/0254546 A1     Aug. 7, 2025

(51) Int. Cl.
*H04W 24/08* (2009.01)
*H04W 24/04* (2009.01)

(52) U.S. Cl.
CPC ........... *H04W 24/08* (2013.01); *H04W 24/04* (2013.01)

(58) Field of Classification Search
None
See application file for complete search history.

(56) References Cited

U.S. PATENT DOCUMENTS

| 8,095,071 | B2 | 1/2012 | Sim |
| 8,364,080 | B2 | 1/2013 | Desai |
| 8,606,182 | B2 | 12/2013 | Wyper |
| 8,913,599 | B2 | 12/2014 | Gonikberg |
| 9,265,089 | B2 | 2/2016 | Gonikberg |
| 10,057,131 | B1 | 8/2018 | Brown |
| 10,606,725 | B2 | 3/2020 | Hanson |

(Continued)

FOREIGN PATENT DOCUMENTS

EP          1 729 463 B1    11/2009

*Primary Examiner* — Christine T Duong

(74) *Attorney, Agent, or Firm* — Prol Intellectual Property Law, PLLC; H. Kenneth Prol

(57) ABSTRACT

A peripheral device workspace cloud orchestrator may comprise a network interface device to receive telemetry readings describing a current usage pattern for an information handling system, available communication protocols at a location for linking the information handling system and a peripheral device, and communication protocol-dependent functional capabilities for the peripheral device operatively coupled to the information handling system at the location to form a peripheral device workspace, and a hardware processor to execute code instructions for the peripheral device workspace cloud orchestrator to instruct the information handling system to operatively couple to the peripheral device using a best-suited communication protocol for selected performance from communication protocol-dependent functional capability data for the peripheral device under the current usage pattern for executing software application on an anchor information handling system node or peripheral device workspace environmental telemetry readings.

20 Claims, 4 Drawing Sheets

(56) References Cited

U.S. PATENT DOCUMENTS

| | | | |
|---|---|---|---|
| 11,321,247 B2 | 5/2022 | Bshara | |
| 2019/0036772 A1* | 1/2019 | Agerstam | ............. H04L 67/566 |
| 2019/0179645 A1 | 6/2019 | Prasad | |
| 2020/0015300 A1 | 1/2020 | Suumaki | |

* cited by examiner

SYSTEM AND METHOD FOR OPERATIVELY COUPLING PERIPHERAL DEVICES WITHIN A PERIPHERAL DEVICE WORKSPACE ACCORDING TO COMMUNICATION PROTOCOL BEST SUITED FOR DEVICE CAPABILITIES

FIELD OF THE DISCLOSURE

The present disclosure generally relates to automatic assessment or configuration of peripheral devices for use in a multi-user shared peripheral device workspace. The present disclosure more specifically relates to determining, recommending, or automatically establishing operative coupling between a plurality of peripheral devices within a peripheral device workspace according from among a plurality of available communication protocols, such as a wired connection, Wi-Fi, Bluetooth®, Wi-Fi Direct®, or Bluetooth® Low Energy (BLE) that is best suited for the capabilities of the peripheral devices being operatively coupled.

BACKGROUND

As the value and use of information continues to increase, individuals and businesses seek additional ways to process and store information. One option available to clients is information handling systems. An information handling system generally processes, compiles, stores, and/or communicates information or data for business, personal, or other purposes thereby allowing clients to take advantage of the value of the information. Because technology and information handling may vary between different clients or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific client or specific use, such as e-commerce, financial transaction processing, airline reservations, enterprise data storage, or global communications. In addition, information handling systems may include a variety of hardware and software components that may be configured to process, store, and communicate information and may include one or more computer systems, data storage systems, and networking systems. The information handling system may include telecommunication, network communication, video communication capabilities, and audio capabilities. The information handling system may be operatively coupled to one or more wireless peripheral input/output devices such as a keyboard, mouse, touchpad, gaming controller, display device, wearable peripheral device, speakers, earbud, headphone, microphone, stylus, or other peripheral devices.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings may indicate similar or identical items.

DETAILED DESCRIPTION OF THE DRAWINGS

Figure 1:
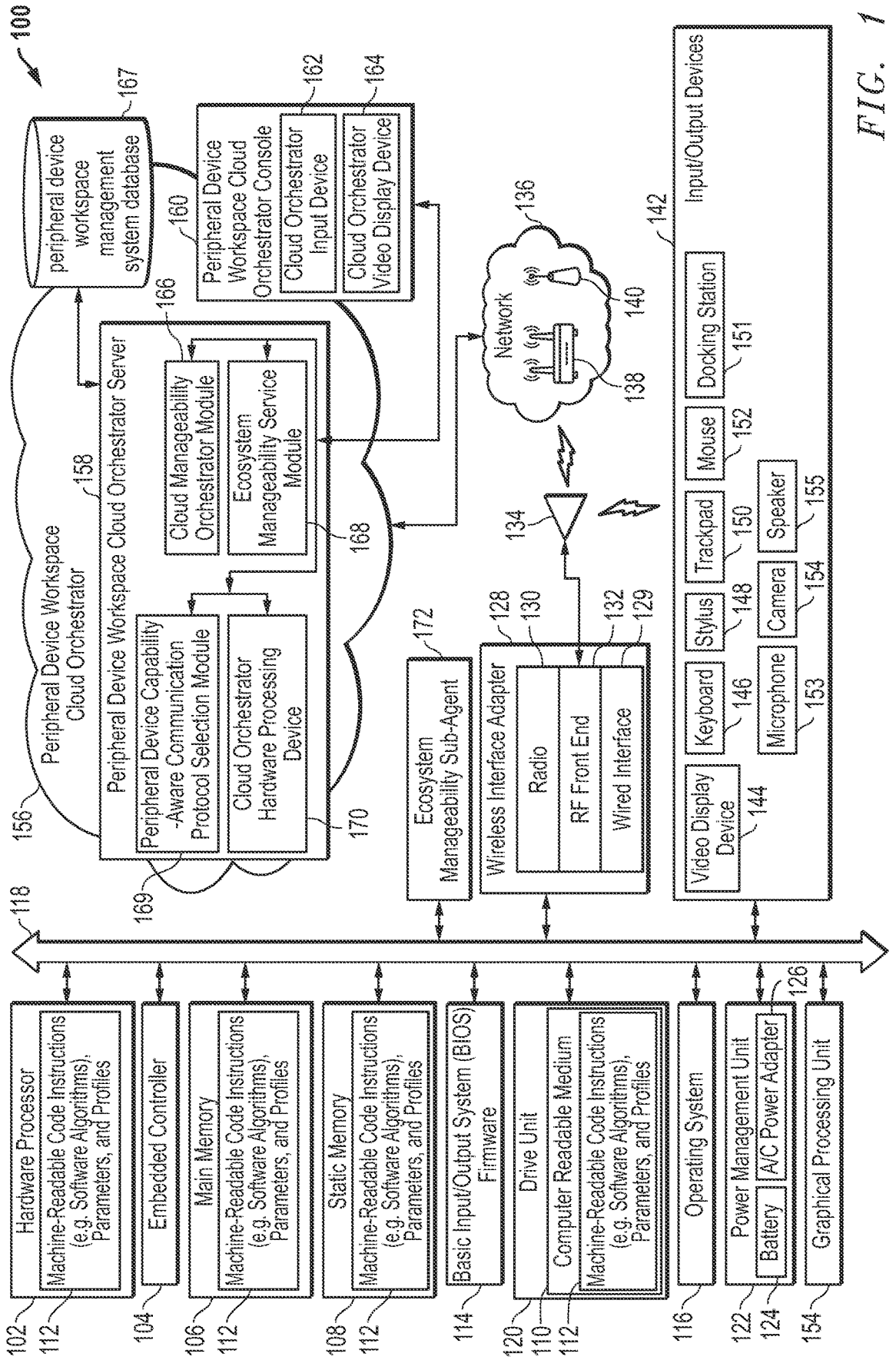
FIG. 1 is a block diagram illustrating a cloud-based information handling system executing code instructions of a peripheral device workspace cloud orchestrator to orchestrate configuration of peripheral devices across a plurality of user peripheral device workspaces according to an embodiment of the present disclosure.

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

A user may oftentimes use an information handling system in a peripheral device peripheral device workspace. In this context, a peripheral device workspace can be defined and established with a peripheral device workspace identification value in memory as a location with a manifest of nodes that includes a user information handling system (e.g., a laptop) as an anchor node and peripheral device nodes that are connected to the user information handling system. Peripheral device operational telemetry readings may be included with a peripheral device workspace under a peripheral device workspace identification value and include for example, time of day, applications being executed, wireless or wired connection capabilities of nodes describing one or more available wired or wireless communication protocols, power consumption capabilities for the nodes, security credentials for the user, and other workspace data. Peripheral devices may commonly include internal or external devices such as displays, a keyboard, a mouse, a webcam, a printer, a speaker, a fingerprint scanner, earbuds, stylus, etc. A peripheral device workspace may include a wired or wireless dock by which the user information handling system connects to some or all the peripheral devices including smart peripheral devices having some compute, input/output or network capabilities.

A peripheral device workspace, in various embodiments, may oftentimes be used for hybrid work scenarios. For example, a business may have an office space that includes hoteling cubes that can be assigned to, reserved by, or otherwise utilized by a plurality of business's employees as peripheral device workspaces. In such cases, the business may allow its employees to connect their laptops to a dock or other nodes in a particular hoteling cube where various peripheral device nodes may be available for use. Users may also employ peripheral device workspaces when working from home or other locations. Some peripheral device workspaces may be personal, shared with other users, or collaborative in various embodiments.

When a user employs multiple peripheral device workspaces (e.g., by connecting a laptop to different combinations of peripherals during a workday), it can be tedious for the user to configure the peripheral device workspaces to his or her preferences. Those multiple peripheral device workspaces may be associated with a user under a user composite peripheral device workspace identifier and include an identification of the user. In an example embodiment, while using one peripheral device workspace, the user may set configurations for the peripherals of the peripheral device workspace to match the user's preferences. If the user switches to a different peripheral device workspace, those configurations may not be consistent with the peripheral devices of the different peripheral device workspace or may result in unintended changes. Further, the user may be unaware of differences in wired or wireless communication protocol availability between such peripheral device workspaces that could impact the user's choice of connectivity between a plurality of peripheral devices in that peripheral device workspace. The user may therefore have to manually reconfigure the peripheral device workspace, or may rely on communication links between peripheral devices that do not take advantage of higher performance communication protocols available at only a portion of the peripheral device workspaces in which that user routinely operates.

Execution of code instructions for an ecosystem manageability sub-agent on a user information handling system may monitor for peripheral device operational telemetry readings of a peripheral device workspace, such as time, location, applications currently executing or planned, connection type (e.g., wireless, wired, wireless wide area network (WWAN), wireless local area network (WLAN), wireless private area network (WPAN)), security credentials for the user, or environmental sensor readings (e.g., humidity, temperature), among other possible operational telemetry readings for the information handling system. These operational telemetry readings may be gathered routinely, or upon each startup of an information handling system, for example. Further, the ecosystem manageability sub-agent executing at the information handling system may create a manifest of peripheral devices at a location to represent the current peripheral device workspace, including an identification of the user, identification of a location (e.g., by global positioning or by network location); an identification of each of the peripheral devices (e.g., by serial number or a Media Access Control (MAC) address) connected to or operably coupled to the information handling system, one or more peripheral device operational telemetry readings (e.g., time, location, applications executing, etc.), and one or more adjustable operational configurations (e.g., resolution for an external display device) for the operably coupled peripheral devices. Peripheral device workspaces may be associated with a peripheral device workspace identification value and include a location identifier and a manifest of peripheral devices or other nodes. The manifest of nodes including peripheral device nodes may include one or more anchor node information handling system, secondary node information handling systems not acting as the anchor node, or systems or smart nodes. Such a peripheral device workspace definition may be stored in a peripheral device workspace cloud orchestrator server database, peripheral device workspace management system database, or similar cloud based database in embodiments herein.

The hardware processor of the user anchor information handling system node may execute code instructions of the ecosystem manageability sub-agent to also collect one or more peripheral device operational telemetry readings (e.g., time, applications executing, hardware component usage metrics, or other telemetry data indicating usage patterns for the information handling system and peripheral devices in a peripheral device workspace), and one or more peripheral device configuration settings (e.g., communication protocol used to operatively couple the peripheral device to an anchor node or other node) for the operably coupled peripheral device nodes. The manifest of peripheral device nodes and other nodes as well as location of a peripheral device workspace described above may be combined with the peripheral device operational telemetry readings for the peripheral device workspace and an identification of the anchor node information handling system user into a peripheral device workspace anchor node status update document written in a machine-readable language or machine markup language such as JavaScript Object Notation (JSON), for example, and transmitted for storage at the peripheral device workspace management system database associated with the peripheral device workspace identification value at a peripheral device workspace management system database operating in a cloud computing platform. The peripheral device workspace identification value for a peripheral device workspace may also have associated with it additional information such as the telemetry information described above or contextual data about the operational capabilities and settings of nodes, including peripheral device nodes, smart peripheral device nodes, anchor information handling system nodes, and secondary (non-anchor) information handling systems in particular peripheral device workspaces. Each time a peripheral device configuration setting is changed by the user, a new peripheral device is added to the peripheral device workspace, the anchor node information handling system moves from a first peripheral device workspace to a second peripheral device workspace, or changes to peripheral device operational telemetry readings for the peripheral device workspace is detected, an updated or a new peripheral device workspace anchor node status update document including this updated configuration may be transmitted to the peripheral device workspace cloud orchestration server.

Each peripheral device within a peripheral device workspace may be associated with an orchestrated device descriptor (ODD) which includes a description of all non-configurable aspects of the peripheral device, such as a list of communication protocols supported by the peripheral device, minimum or maximum performance capabilities for each communication protocol, and average power consumption associated with links established according to each of those communication protocols. The minimum or maximum performance capabilities for each communication protocol listed within an ODD for a given device may be, for example, a relative signal strength indicator (RSSI), range, throughput, latency, dropped packets, or any other key performance indicator (KPI) for communications or other operational performance listed within performance specifications for that device, as developed and distributed by the peripheral device manufacturer.

Various peripheral device workspaces such as the hybrid work office peripheral device workspaces and other peripheral device workspaces described herein may be defined by location indicator detected for a primary or anchor node information handling system operating at the peripheral device workspace, and a manifest of nodes of peripheral devices and smart devices that may operate in the peripheral device workspace. Each such defined peripheral device workspace may also be assigned a peripheral device workspace identification value which may be stored and associated with stored manifests of nodes operating in the peripheral device workspace. Additional orchestrated device descriptors (ODDs) for one or more peripheral devices within a peripheral device workspace or peripheral device operational telemetry readings for the peripheral device workspace may be stored within one or more peripheral device workspace anchor node status update documents as well as included in the definition of the peripheral device workspace and associated with its peripheral device workspace identification value defined at the peripheral device workspace cloud orchestrator server and stored in an operatively coupled database. This may include peripheral device functional capabilities, peripheral device connectivity details, current peripheral device configurations or settings, peripheral device setting or configuration options, current status of the peripheral devices within the peripheral device workspace, and other features of nodes within the peripheral device workspace. For example, the definition of the peripheral device workspace associated with a specific peripheral device workspace identification value may include a list of communication protocols supported by each of the peripheral device nodes within the peripheral device workspace, minimum or maximum performance capabilities for each communication protocol per peripheral device, and average power consumption per communication protocol and per peripheral device. As another example, the definition of the peripheral device workspace associated with a specific peripheral device workspace identification value may also include a set of peripheral device operational telemetry readings stored within one or more peripheral device workspace anchor node status update documents, such as time, applications currently executing or planned, connection types currently available (e.g., via external routers), or environmental sensor readings (e.g., humidity, temperature), among other possible peripheral device operational telemetry readings for an anchor node information handling system or other nodes operating within the defined peripheral device workspace.

A peripheral device workspace may be defined by a location identifier (e.g., location in a wireless or wired network, global positioning, or other with association with a physical location), a list of peripheral devices operatively coupled to an anchor or primary node information handling system for a user, type of peripheral device workspace (e.g., personal, hoteling office/shared, or collaborative), and additionally in some cases, by one or more of the peripheral device operational telemetry readings for the peripheral device workspace described herein. Each of these defining factors may be associated in a memory database for the peripheral device workspace management system executing at one or more peripheral device workspace cloud orchestrator servers with the peripheral device workspace identification value, which may also be associated with one or more peripheral device operational configuration policies describing how the peripheral device nodes within the defined peripheral device workspace are to operate. Thus, a particular peripheral device operational configuration policy for one or more peripheral devices within a given peripheral device workspace having a peripheral device workspace identification value may apply only when certain peripheral device operational telemetry readings, such as telemetries describing currently available communication protocols for those peripheral devices are detected. In such a way, the peripheral device operational configuration policy for a peripheral device within a peripheral device workspace may be defined or associated with particularly defined usage patterns for that peripheral device. For example, a peripheral device operational configuration policy may apply only when certain software applications are executing at the anchor node information handling system defined within the peripheral device workspace and which require certain performance levels of communication, components, processing or other aspects of one or more peripheral device nodes.

The memory database for the peripheral device workspace management system executing at one or more peripheral device workspace cloud orchestrator servers may further store a user composite peripheral device workspace identifier that is unique to individual users of one or more defined peripheral device workspaces that are associated with identification of the user of the user's information handling system and peripheral device workspace identification values of the peripheral device workspaces used by that user. Thus, a user composite peripheral device workspace identifier may identify a single user of an anchor node information handling system, and a peripheral device workspace identification value for each of one or more peripheral device workspaces in which the user's information handling system operates as an anchor node at various times. The user composite peripheral device workspace identifier may thus be user-specific and user-centric. The peripheral device workspace identification value, in comparison, may define a location and list of peripheral device nodes, and may thus be peripheral device workspace-centric.

As described herein, when users shift from a first peripheral device workspace to a second peripheral device workspace, there is often a mismatch between the communication protocols available for operative coupling between a plurality of peripheral devices at these first and second peripheral device workspaces. As such, the choice of communication protocols for links among peripheral devices that is best suited for each of the peripheral devices' respective capabilities within the first peripheral device workspace may not match the best choice of communication protocols for those links within the second peripheral device workspace. Code instructions for the peripheral device capability aware communication protocol selection module operating on one or more peripheral device workspace maintenance cloud servers may be executed each time a user joins a new peripheral device workspace to determine availability of wired and wireless protocols for establishing communication links between peripheral devices within the new peripheral device workspace, determine capabilities of each of these peripheral devices according to each currently available communication protocol, and for each peripheral device, to identify, recommend, or automatically establish a link according to the communication protocol associated with capabilities meeting critical-rated requirements for that peripheral device.

For example, upon the user information handling system anchor node powering up at a new peripheral device workspace location, the anchor node information handling system may generate or gather and transmit to the peripheral device capability aware communication protocol selection module the manifest of peripheral devices within the new peripheral device workspace, an identification of the user of the user's information handling system anchor node, an orchestrated device descriptor (ODD) for each peripheral device within the peripheral device workspace, and peripheral device workspace peripheral device operational telemetry readings as described above with respect in a peripheral device workspace anchor node status update document. Code instructions of the peripheral device capability aware communication protocol selection module may then execute at one or more peripheral device workspace cloud orchestrator servers to generate a peripheral device protocol and capabilities table that lists each of the communication protocols currently available for operative coupling among peripheral devices, as drawn from the peripheral device workspace primary node status update document, and, for each of these available protocols, a minimum or maximum performance capability for each communication protocol, as listed within an ODD for a given device. As described herein, these capabilities may include, for example, a relative signal strength indicator (RSSI), range, throughput, latency, dropped packets, or any other key performance indicator (KPI) listed within performance specifications for that device, as developed and distributed by the peripheral device manufacturer. This peripheral device protocol and capabilities table in embodiments may thus indicate, for each of the peripheral devices within the peripheral device workspace, best capabilities for each available communication protocol within the current peripheral device workspace.

Code instructions for the peripheral device capability aware communication protocol selection module may then be executed at the one or more peripheral device workspace cloud orchestrator servers to determine one or more currently critical-rated performance capability, metric, or indicator for each device based on the way in which that peripheral device is currently being used within the peripheral device workspace. For example, the peripheral device capability aware communication protocol selection module may determine that low power consumption is a highly rated priority for a peripheral device with low current battery levels, or a peripheral device or anchor node operating in low-power status. As another example, the code instructions for the peripheral device capability aware communication protocol selection module may be executed to rank a plurality of key performance indicators (KPIs) such as capable throughput, RSSI, or latency based on the software applications currently being executed at the primary or anchor node information handling system, such as a slide presentation or a videoconferencing application.

In any of these scenarios, the code instructions for the peripheral device capability aware communication protocol selection module may be executed at one or more peripheral device workspace cloud orchestrator servers to determine a most critical capability or a plurality of capabilities ranked according to criticality for the current usage pattern of each peripheral device within the current peripheral device workspace. Code instructions for the peripheral device capability aware communication protocol selection module may then be executed to determine, using these one or more critical capabilities and the peripheral device protocol and capabilities table, for each peripheral device in the peripheral device workspace, a communication protocol for each peripheral device to operatively couple to another peripheral device associated with capabilities rated as critical to current usage patterns. Upon such a determination, code instructions for the peripheral device capability aware communication protocol selection module may execute to transmit a recommendation or instruction for automatic execution at the peripheral device capability aware communication protocol selection agent for the primary or anchor node information handling system of the peripheral device workspace to establish one or more communication links among the peripheral devices of the peripheral device workspace according to such a determination. In such a way, execution of code instructions for the peripheral device capability aware communication protocol selection module and agent in embodiments may operate to determine availability of wired and wireless protocols for establishing communication links between peripheral devices within the new peripheral device workspace, determine capabilities of each of these peripheral devices according to each currently available communication protocol, and for each peripheral device, to identify, recommend, or automatically establish a link according to the communication protocol associated with capabilities meeting a criticality rating for performance for that peripheral device node.

FIG. 1 illustrates an information handling system 100 similar to the information handling systems according to several aspects of the present disclosure. In the embodiments described herein, an information handling system 100 includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system 100 may be a personal computer, mobile device (e.g., personal digital assistant (PDA) or smart phone), server (e.g., blade server or rack server), a consumer electronic device, a network server or storage device, a network router, switch, or bridge, wireless router, or other network communication device, a network connected device (cellular telephone, tablet device, etc.), IoT computing device, wearable computing device, a set-top box (STB), a mobile information handling system, a palmtop computer, a laptop computer, a desktop computer, a communications device, an access point (AP) 138, a base station transceiver 140, a wireless telephone, a control system, a camera, a scanner, a printer, a personal trusted device, a web appliance, or any other suitable machine capable of executing a set of instructions (sequential or otherwise) that specify actions to be taken by that machine, and may vary in size, shape, performance, price, and functionality. It is appreciated that, in some embodiments herein, the information handling system 100 may be one of a plurality of device nodes as part of a peripheral device workspace described in embodiments herein or an information handling system 100 may serve as a peripheral device workspace cloud orchestrator server 158 that is operatively coupled to a peripheral device workspace cloud orchestrator console 160 in the peripheral device workspace cloud orchestrator 156 described herein.

In an embodiment, the cloud orchestrator console 160 graphical user interface may also be presented at an information handling system 100 itself that is used by an internet technology decision maker (ITDM) to create peripheral device operational configuration policies with one or more peripheral device workspace cloud orchestrator servers 158 to be propagated down to node devices within a peripheral device workspace such as the information handling system 100, a docking station 151, video display device 144, keyboard 146, stylus 148, microphone 153, camera 154, speaker 155, trackpad 150, mouse 152, and the like. In this embodiment, the information handling system 100, may receive the peripheral device operational configuration policies generated by the ITDM at the peripheral device workspace cloud orchestrator console 160, or generated by the peripheral device workspace cloud manageability orchestrator module 166 based on default peripheral device configuration settings via execution of code instructions of the cloud manageability orchestrator module 166 and the ecosystem manageability service module 168 at the peripheral device workspace cloud orchestrator server 158 as described in embodiments herein.

Thus, in a networked deployment, the information handling system 100 may operate in the capacity of a client computer in a server-client network environment, or as a peer computer system in a peer-to-peer (or distributed) network environment. In an embodiment, the information handling system 100 may be implemented using electronic devices that provide voice, video, or data communication. For example, an information handling system 100 may be any mobile or other computing device capable of executing a set of instructions (sequential or otherwise) that specify actions to be taken by that machine. Further, while a single information handling system 100 is illustrated, the term "system" shall also be taken to include any collection of systems or sub-systems that individually or jointly execute a set, or plural sets, of instructions to perform one or more computer functions.

The information handling system 100 may include main memory 106, (volatile (e.g., random-access memory, etc.), or static memory 108, nonvolatile (read-only memory, flash memory etc.) or any combination thereof), one or more hardware processing resources, such as a hardware processor 102 that may be a central processing unit (CPU), a graphics processing unit (GPU) 103, embedded controller (EC) 104, or any combination thereof. Additional components of the information handling system 100 may include one or more storage devices such as static memory 108 or drive unit 120. The information handling system 100 may include or interface with one or more communications ports for communicating with external devices, as well as various input and output (I/O) devices 142, such as a docking station 151, a mouse 152, a trackpad 150, a keyboard 146, a stylus 148, a video/graphics display device 144, a microphone 153, a camera 154 such as a webcam, an external speaker or headset 155, or any combination thereof. Portions of an information handling system 100 may themselves be considered information handling systems 100.

Information handling system 100 may include devices or modules that embody one or more of the devices or execute instructions for one or more systems and modules. The information handling system 100 may execute instructions (e.g., software algorithms), parameters, and profiles 112 that may operate on servers or systems, remote data centers, or on-box in individual client information handling systems according to various embodiments herein. In some embodiments, it is understood any or all portions of instructions (e.g., software algorithms), parameters, and profiles 112 may operate on a plurality of information handling systems 100.

The information handling system 100 may include the hardware processor 102 such as a central processing unit (CPU). Any of the processing resources may operate to execute code that is either firmware or software code. Moreover, the information handling system 100 may include memory such as main memory 106, static memory 108, and disk drive unit 120 (volatile (e.g., random-access memory, etc.), nonvolatile memory (read-only memory, flash memory etc.) or any combination thereof or other memory with computer readable medium 110 storing instructions (e.g., software algorithms), parameters, and profiles 112 executable by the EC 104, hardware processor 102, GPU 103, or any other hardware processing device. The information handling system 100 may also include one or more buses 118 operable to transmit communications between the various hardware components such as any combination of various I/O devices 142 as well as between hardware processors 102, an EC 104, the operating system (OS) 116, the basic input/output system (BIOS) 114, the wireless interface adapter 128, or a radio module, among other components described herein. In an embodiment, the information handling system 100 may be in wired or wireless communication with the I/O devices 142 such as a docking station 151, a keyboard 146, a mouse 152, video display device 144, stylus 148, a microphone 153, a camera 154 such as a webcam, an external speaker or headset 155, or trackpad 150 among other peripheral devices any combination of which may form one or more various peripheral device workspaces according to embodiments herein.

The information handling system 100 further includes a video/graphics display device 144. The video/graphics display device 144 in an embodiment may function as a liquid crystal display (LCD), an organic light emitting diode (OLED), a flat panel display, a projector device to which a plurality of information handling systems may operatively couple, or a solid-state display. It is appreciated that the video/graphics display device 144 may be wired or wireless and may be an external video/graphics display device 144 that allows a user to increase the desktop area by extending the desktop, or for a plurality of information handling systems to share video for display via a projector in various embodiments. Additionally, as described herein, the information handling system 100 may include or be operatively coupled to one or more other I/O devices 142 including the wired or wireless mouse 152 described herein that allows the user to interface with the information handling system 100 via the video/graphics display device 144, a cursor control device (e.g., a trackpad 150, or gesture or touch screen input), a stylus 148, a microphone 153, a camera 154 such as a webcam, an external speaker or headset 155, and/or a keyboard 146, among others. Information handling system 100 may also be operatively coupled to a peripheral device 142 such as a docking station 151 or other smart peripheral device having a hardware processing device such as a hardware processor, microcontroller, or other hardware processing resource and which may further be operatively coupled to one or more additional peripheral devices 142. As described herein, each of these input/output devices 142 may each be a node device associated with the information handling system 100 and may be part of a peripheral device workspace defined and identified with a peripheral device workspace identification value via execution of the ecosystem manageability service module 168 and cloud manageability orchestrator module 166, as described in embodiments herein. Various drivers and hardware control device electronics may be operatively coupled to operate the I/O devices 142 according to the embodiments described herein. The present specification contemplates that the I/O devices 142 may be wired or wireless.

A network interface device 128 of the information handling system 100 may be wired network interface 129 or a wireless interface adapter that can provide connectivity among devices such as with Bluetooth® or to a wireless or wired network 136, e.g., a wide area network (WAN), a local area network (LAN), wireless local area network (WLAN), a wireless personal area network (WPAN), a wireless wide area network (WWAN), or other network. In an embodiment, this network 136 may be operatively coupled to or include a peripheral device workspace cloud orchestrator 156 that includes one or more servers (e.g., peripheral device workspace cloud orchestrator server 158) or other computing devices that provide computer system resources as described herein that allow for the creation and maintenance of peripheral device workspaces (e.g., as shown below in FIGS. 2, and 3) and orchestration of different node devices within one or more peripheral device workspaces. The network interface device 128 may be operatively coupled, via wired or wirelessly, to one or more external peripheral devices 142 or other nodes such as smart nodes within a peripheral device workspace according to embodiments herein. In some embodiments described herein, the wireless interface device 128 with its radio 130, RF front end 132 and antenna 134 is used to communicate with the wireless peripheral devices via, for example, Wi-Fi, Wi-Fi Direct®, Bluetooth® or Bluetooth® Low Energy (BLE) protocols. In an embodiment, the WAN, WWAN, LAN, and WLAN may each include an AP 138 or base station 140 or a network interface at servers in network 136 used to operatively couple the information handling system 100 to the network 136. In a specific embodiment, the network 136 may include macro-cellular connections via one or more base stations 140 or a wireless AP 138 (e.g., Wi-Fi), or such as through licensed or unlicensed WWAN small cell base stations 140. Connectivity may be via wired or wireless connection. For example, network wireless APs 138 or base stations 140 may be operatively connected to the information handling system 100. In other embodiments, the RF front end 132 may establish a Wi-Fi Direct® wireless link adhering to the Wi-Fi protocols, but without the use of a wireless AP 138 or base station 140. In example embodiments, wired, Bluetooth®, Wi-Fi or other wireless links may provide for a direct, single hop link between the information handling system 100 and any one of the peripheral devices 142, or among a plurality of such peripheral devices 142 such as within a peripheral device workspace.

Network interface device 128 may include one or more radio frequency (RF) subsystems (e.g., radio 130) with transmitter/receiver circuitry, modem circuitry, one or more antenna radio frequency (RF) front end circuits 132, one or more wireless controller circuits, amplifiers, antennas 134 and other circuitry of the radio 130 such as one or more antenna ports used for wireless communications via multiple radio access technologies (RATs). The radio 130 may communicate with one or more wireless technology protocols via an antenna 134.

In an embodiment, the network interface device 128 operating as a wireless interface adapter may operate in accordance with any wireless data communication standards. To communicate with a wireless local area network, standards including IEEE 802.11 WLAN standards (e.g., IEEE 802.11ax-2021 (Wi-Fi Direct®, Wi-Fi 6E, 6 GHZ)), IEEE 802.15 WPAN standards, WWAN such as 3GPP or 3GPP2, Bluetooth® standards, or similar wireless standards may be used. Network interface device 128 as a wireless interface adapter may connect to any combination of macro-cellular wireless connections including 2G, 2.5G, 3G, 4G, 5G or the like from one or more service providers. Utilization of radio frequency communication bands according to several example embodiments of the present disclosure may include bands used with the WLAN standards and WWAN carriers which may operate in both licensed and unlicensed spectrums. The network interface device 128 may provide for one or more wired interfaces 129 such as via an ethernet wired connection for network connection to network 136. The network interface device 128 may also provide for one or more wired interfaces 129 for a bus connection to bus 118 such as via a Universal Serial Bus port, Display Port, HDMI port or other port for connectivity to one or more external peripheral devices 142 or other nodes, for example a docking station, within a peripheral device workspace in embodiments herein. The network interface device 128 can represent an add-in card, wireless network interface module that is integrated with a main board of the information handling system 100 or integrated with another wireless network interface capability, or any combination thereof.

In some embodiments, software, firmware, dedicated hardware implementations such as application specific integrated circuits, programmable logic arrays and other hardware devices may be constructed to implement one or more of some systems and methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system encompasses software, firmware, and hardware implementations.

In accordance with various embodiments of the present disclosure, the methods described herein may be implemented by firmware or software programs executable by a hardware controller or a hardware processor system. Further, in an exemplary, non-limited embodiment, implementations may include distributed hardware processing, component/object distributed hardware processing, and parallel hardware processing. Alternatively, virtual computer system processing may be constructed to implement one or more of the methods or functionalities as described herein.

The present disclosure contemplates a computer-readable medium that includes instructions, parameters, and profiles 112 or receives and executes instructions, parameters, and profiles 112 responsive to a propagated signal, so that a hardware device connected to a network 136 may communicate voice, video, or data over the network 136. Further, the instructions 112 may be transmitted or received over the network 136 via the network interface device or wireless interface adapter 128. It is appreciated that any computing device including the cloud orchestrator server 158, the cloud orchestrator console 160, and the information handling system 100 may include a computer-readable medium that includes instructions, parameters, and profiles 112.

The information handling system 100 may include a set of instructions 112 that may be executed to cause the computer system to perform any one or more of the methods or computer-based functions disclosed herein. For example, instructions 112 may be executed by a hardware processor 102, GPU 103, EC 104 or any other hardware processing resource and may include software agents, or other aspects or components used to execute the methods and systems described herein. Various software modules comprising application instructions 112 may be coordinated by an OS 116, and/or via an application programming interface (API). An example OS 116 may include Windows®, Android®, and other OS types. Example APIs may include Win 32, Core Java API, or Android APIs.

In an embodiment, the information handling system 100 may include a disk drive unit 120. The disk drive unit 120 and may include machine-readable code instructions, parameters, and profiles 112 in which one or more sets of machine-readable code instructions, parameters, and profiles 112 such as firmware or software can be embedded to be executed by the hardware processor 102 or other hardware processing devices such as a GPU 103 or EC 104, or other microcontroller unit to perform the processes described herein. Similarly, main memory 106 and static memory 108 may also contain a computer-readable medium for storage of one or more sets of machine-readable code instructions, parameters, or profiles 112 described herein. The disk drive unit 120 or static memory 108 also contain space for data storage. Further, the machine-readable code instructions, parameters, and profiles 112 may embody one or more of the methods as described herein. In a particular embodiment, the machine-readable code instructions, parameters, and profiles 112 may reside completely, or at least partially, within the main memory 106, the static memory 108, and/or within the disk drive 120 during execution by the hardware processor 102, EC 104, or GPU 103 of information handling system 100.

Main memory 106 or other memory of the embodiments described herein may contain computer-readable medium (not shown), such as RAM in an example embodiment. An example of main memory 106 includes random access memory (RAM) such as static RAM (SRAM), dynamic RAM (DRAM), non-volatile RAM (NV-RAM), or the like, read only memory (ROM), another type of memory, or a combination thereof. Static memory 108 may contain computer-readable medium (not shown), such as NOR or NAND flash memory in some example embodiments. The applications and associated APIs, for example, may be stored in static memory 108 or on the disk drive unit 120 that may include access to a machine-readable code instructions, parameters, and profiles 112 such as a magnetic disk or flash memory in an example embodiment. While the computer-readable medium is shown to be a single medium, the term "computer-readable medium" includes a single medium or multiple media, such as a centralized or distributed database, and/or associated caches and servers that store one or more sets of machine-readable code instructions. The term "computer-readable medium" shall also include any medium that is capable of storing, encoding, or carrying a set of machine-readable code instructions for execution by a processor or that cause a computer system to perform any one or more of the methods or operations disclosed herein.

In an embodiment, the information handling system 100 may further include a power management unit (PMU) 122 (a.k.a. a power supply unit (PSU)). The PMU 122 may include a hardware controller and executable machine-readable code instructions to manage the power provided to the components of the information handling system 100 such as the hardware processor 102 and other hardware components described herein. The PMU 122 may control power to one or more components including the one or more drive units 120, the hardware processor 102 (e.g., CPU), the EC 104, the GPU 103, a video/graphic display device 144, or other wired I/O devices 142 such as the mouse 152, the stylus 148, a microphone 153, a camera 154 such as a webcam, an external speaker or headset 155, a keyboard 146, and a trackpad 150 and other components that may require power when a power button has been actuated by a user. In an embodiment, the PMU 122 may monitor power levels and be electrically coupled to the information handling system 100 to provide this power. The PMU 122 may be coupled to the bus 118 to provide or receive data or machine-readable code instructions. The PMU 122 may regulate power from a power source such as the battery 124 or AC power adapter 126. In an embodiment, the battery 124 may be charged via the AC power adapter 126 and provide power to the components of the information handling system 100, via wired connections as applicable, or when AC power from the AC power adapter 126 is removed.

In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium 110 can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or machine-readable code instructions may be stored.

In other embodiments, dedicated hardware implementations such as application specific integrated circuits (ASICs), programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses hardware resources executing software or firmware, as well as hardware implementations.

As described herein, the information handling system 100 is operatively coupled to a peripheral device workspace cloud orchestrator 156 that includes any number of servers, computing devices, and other cloud computing resources such as the peripheral device workspace cloud orchestrator server 158. The peripheral device cloud orchestrator 156 may, therefore, include any hardware that may be distributed over multiple physical locations but act in concert with each other and specifically the peripheral device workspace cloud orchestrator server 158 to facilitate maintenance and implementation of peripheral device operational configuration policies for a plurality of peripheral device workspaces, wherein the one or more node devices (e.g., including the information handling system 100 as an anchor node device, and one or more peripheral device nodes such as I/O devices 142) form part of each peripheral device workspace, create or adjust peripheral device operational configuration policies based on the registered node devices detected within the one or more created peripheral device workspaces, and apply the peripheral device operational configuration policies to the created peripheral device workspace(s). It is appreciated that the node devices described herein may include each of the peripheral devices operatively coupled to the information handling system 100 acting as a primary or anchor node device and the workspaces created may be described as a peripheral device workspace.

The peripheral device workspace cloud orchestrator server 158 one or more of any computing device that may include similar elements as the information handling system 100 such as a memory device, a cloud orchestrator hardware processing device 170, a PMU, access to a database memory 167 and other elements that allow the peripheral device workspace cloud orchestrator server 158 to execute code instructions of the cloud manageability orchestrator module 166, ecosystem manageability service module 168, peripheral device capability-aware communication protocol selection module 169, and other software as described herein. In an embodiment, the peripheral device workspace cloud orchestrator server 158 may be operatively coupled to a peripheral device workspace cloud orchestrator console 160 graphical user interface. The peripheral device workspace cloud orchestrator console 160 graphical user interface may be used by the ITDM in some embodiments to create and propagate peripheral device operational configuration policies, or to set various threshold values such as the overall experience compliance rating threshold value described herein. Such peripheral device operational configuration policies may be adjusted by execution of code instructions of the peripheral device capability aware communication protocol selection module 169 to include an instruction to operatively couple the information handling system 100 to the peripheral device (e.g., 142) via the communication protocol identified as having the total performance capability values that meet a criticality level of requirements for operation of the peripheral device in a peripheral device workspace, as described in greater detail below with respect to FIGS. 3 and 4. It is appreciated that the peripheral device workspace cloud orchestrator console 160 graphical user interface may be interacted with via a cloud orchestrator input device 162 and a cloud orchestrator video display device 164 that allows the ITDM to complete these processes and engage with the peripheral device workspace cloud orchestrator server 158 in an embodiment.

An information technology decision maker (ITDM) for an enterprise may also use peripheral device workspace cloud orchestrator console 160 graphical user interface to provide, at least in part, a communication protocol and usage pattern rules data, for example in a table format or other addressable format, to the peripheral device workspace cloud orchestrator 156 executing at the peripheral device workspace cloud orchestrator server 158 for determining operation policy for information handling system nodes and peripheral device nodes in an enterprise. The communication protocol and usage pattern rules data in such an example embodiment may associate one or more peripheral device operational telemetry readings, which may include telemetry readings for the information handling system 100 or the peripheral device (e.g., 142) in embodiments, with one or more critical KPIs. This may be done in order to define a highest priority or ranked or weighted list of priorities for peripheral device functional capabilities based on a detected usage pattern or current workload, as reflected in the received peripheral device operational telemetry readings.

For example, the communication protocol and usage pattern rules data may identify, rank, or weigh various KPIs that are most critical during execution of a specific software application at the information handling system 100 with which the peripheral device 142 may communicate via one or more available communication protocols. The criticality of these KPIs may be defined by the communication protocol and usage pattern rules data as well as may be drawn from minimum system requirements for a given software applications or peripheral device nodes in some embodiments. In other embodiments, the critical KPIs may be defined according to the peripheral device 142 in use. Other embodiments contemplate any combination of one or more peripheral device operational telemetry readings with one or more critical KPIs given within Table 2 or other format of communication protocol and usage pattern rules data.

As described herein, the communication protocol and usage pattern rules data may provide a most critical KPI for a given peripheral device operational telemetry reading or combination of peripheral device operational telemetry readings, or may provide a plurality of critical KPIs for each of these scenarios. In some cases, a plurality of critical KPIs may be equally weighted, unless otherwise specified in the communication protocol and usage pattern rules data. In other embodiments, the communication protocol and usage pattern rules data may rank a plurality of critical KPIs for a given peripheral device operational telemetry reading or combination of peripheral device operational telemetry readings. In still other embodiments, the communication protocol and usage pattern rules data may weight each of a plurality of critical KPIs for a given peripheral device operational telemetry reading or combination of peripheral device operational telemetry readings.

As described herein, the peripheral device workspace cloud orchestrator server 158 includes a computer-readable program code of a peripheral device workspace cloud manageability orchestrator module 166 that, when executed by the cloud orchestrator hardware processing device 170 of the peripheral device workspace cloud orchestrator server 158, manages creation and adjustment of peripheral device operational configuration policies for one or more node devices. In the context of embodiments of the present specification and in the appended claims, a peripheral device workspace may be an ecosystem of node devices (e.g., including peripheral devices coupled to the information handling system 100, a docking station 151, etc.) connected to a primary or anchor node device such as the information handling system 100. In an embodiment, a peripheral device workspace may also be defined with a peripheral device workspace identification value and be part of a user composite peripheral device workspace identifier for a user and associated with each of the information handling system 100 and peripheral devices (e.g., input/output devices 142) such that a user may have multiple peripheral device workspaces having peripheral device workspace identification values that are associated with the user based on the context and/or environment of each identified peripheral device workspace. For example, a user composite peripheral device workspace identifier may be used to define a first peripheral device workspace at a home office having a first peripheral device workspace identification value, a second peripheral device workspace at a work office having a second peripheral device workspace identification value, a third peripheral device workspace that may be collaborative at a different location (e.g., a conference room) having a third peripheral device workspace identification value, and other peripheral device workspaces that can be defined by both the node devices included within the peripheral device workspace and the location of the peripheral device workspace (e.g., defined by location data such as GPS data, network data, or other data to link to a physical location) and having a peripheral device workspace identification value.

In an embodiment, the execution of computer-readable program code of the peripheral device workspace cloud manageability orchestrator module 166 executing at the one or more peripheral device workspace cloud orchestrator server 158 receives, creates, or adjusts peripheral device operational configuration policies based on the registered node devices detected within the one or more created peripheral device workspaces having peripheral device workspace identification values. In some embodiments, the peripheral device operational configuration policies may be received from the peripheral device workspace cloud orchestrator console 160 as initiated by the ITDM. The ITDM may be any information technology decision maker that may decide the peripheral device operational configuration policies for an enterprise of managed nodes to be associated with plurality of peripheral device workspaces formed at the peripheral device workspace cloud orchestrator server 158 and managed therefrom with each having peripheral device workspace identification values. In other example embodiments, these settings may be set by the peripheral device workspace cloud manageability orchestrator module 166 to utilize a default configuration determined based on identified capabilities of a given peripheral device. In various other embodiments herein, existing peripheral device operational configuration policies that have been previously applied in previously used peripheral device workspaces, such as those defining connectivity requirements and communication protocols used may be adjusted or edited by code instructions of a peripheral device capability-aware communication protocol selection module 169 executing at one or more peripheral device workspace cloud orchestrator servers 158, as described in greater detail below and with respect to FIGS. 3 and 4.

In various embodiments herein, the peripheral device workspace cloud orchestrator console 160 may propagate these peripheral device operational configuration policies to the peripheral device workspace cloud orchestrator server 158 executing the peripheral device workspace cloud manageability orchestrator module 166. Upon establishing these peripheral device operational configuration policies in the communication protocol and usage pattern rules data at the peripheral device workspace cloud manageability orchestrator module 166, and selected, adjusted or edited by execution of the peripheral device capability-aware communication protocol selection module 169 based on environmental telemetry data gathered from the peripheral device workspace, the execution of the peripheral device workspace cloud manageability orchestrator module 166 may propagate these peripheral device operational configuration policies to each of the device nodes within the created peripheral device workspace.

In an embodiment, the peripheral device workspace cloud orchestrator server 158 may also execute computer readable program code of an ecosystem manageability service module 168. Execution of the ecosystem manageability service module 168 at one or more peripheral device workspace cloud orchestrator servers 158 applies the peripheral device operational configuration policies to the created peripheral device workspace via transmission of instructions via an anchor node information handling system. In an embodiment, the peripheral device workspace cloud manageability orchestrator module 166 creates, and the peripheral device capability-aware communication protocol selection module 169 may adjust peripheral device operational configuration policies for each of the one or more node devices within the peripheral device workspace. As described herein, the ecosystem manageability service module 168 executing at the peripheral device workspace cloud orchestrator server 158 may identify those peripheral devices 142 that form part of the peripheral device workspace having a peripheral device workspace identifier value and may propagate those peripheral device operational configuration policies that apply to those peripheral devices. For example, where a plurality of peripheral device workspaces with a plurality of peripheral device workspace identifier values each include a specific wireless mouse for which a peripheral device operational configuration policy has been created or updated, the execution of the computer-readable program code of the ecosystem manageability service module 168 at the one or more peripheral device workspace cloud orchestrator servers 158 to send those peripheral device operational configuration policies to the appropriate peripheral device workspace (e.g., to each of the primary or anchor node devices 100) so that those peripheral device operational configuration policies may be passed to the wireless mice in each peripheral device workspace having a peripheral device workspace identifier value where such as specific mouse model or type is located.

A node device database, such as peripheral device workspace management system database 167, operatively coupled to the peripheral device workspace cloud orchestrator server 158 may provide the peripheral device workspace cloud orchestrator server 158 with details regarding the node devices detected and forming the peripheral device workspaces and associated particular peripheral device workspace identification values described herein. For example, the node device database may include data regarding the possible settings for any given node device, compatibility of these node devices with other node devices within any given peripheral device workspace, and capabilities of the node devices among other characteristics and features of the node devices.

An information handling system 100 that is operatively connected to one or more peripheral devices 142 in an embodiment may operate as an anchor node for the peripheral device workspace in that it gathers capabilities and peripheral device operational telemetry readings about all of the peripheral devices 142, within a given peripheral device workspace, as described directly below, communicates those peripheral device operational telemetry readings to the cloud manageability orchestrator module 166, receives peripheral device operational configuration policies describing how to configure the peripheral devices 142, and the anchor node information handling system 100 itself, and implements peripheral device operational configuration policies. Peripheral device operational telemetry readings in embodiments herein may also include any operational telemetry readings for an anchor node information handling system 100 or a secondary node information handling system that is not acting as the anchor node for a given peripheral device workspace, but is operatively coupled to one or more peripheral devices within the peripheral device workspace.

As a single information handling system 100 moves between a plurality of peripheral device workspaces, the peripheral device capability-aware communication protocol selection module 169 may determine the best or most appropriate peripheral device operational configuration policies for a given peripheral device workspace, based on current usage patterns for the peripheral devices 142, the anchor node information handling system 100, or any secondary node information handling systems, available communication protocols for operative coupling among any of these devices, and communication protocol-dependent peripheral device functional capabilities for one or more of the peripheral devices 142, as defined within a peripheral device orchestrated device descriptor (ODD) for a given peripheral device 142. Such a determination may further depend upon the peripheral device operational telemetry readings, which may describe current usage patterns and may include, for example, time of day, applications being executed, wireless or wired connection capabilities, or security credentials for the user. In such a way, execution of code instructions of the peripheral device capability-aware communication protocol selection module 169 at the one or more peripheral device workspace cloud orchestrator servers 158 may automatically update peripheral device 142 configurations to select a wired or wireless communication protocol for operative coupling with an anchor node 100 that is best-suited to meet levels of criticality of operation of the peripheral device 142 for current usage patterns at the anchor node 100, secondary information handling system node, or peripheral device 142.

Each peripheral device 142 within a peripheral device workspace may be associated with an orchestrated device descriptor (ODD) which includes a description of all non-configurable aspects of the peripheral device 142, such as a list of communication protocols supported by the peripheral device 142, minimum or maximum performance capabilities for each communication protocol, and average power consumption associated with links established according to each of those communication protocols. The minimum or maximum performance capabilities for each communication protocol listed within an ODD for a given device may be, for example, a relative signal strength indicator (RSSI), range, throughput, latency, dropped packets, or any other key performance indicator (KPI) listed within performance specifications for communications or other operational component performance for that device. Such an ODD may be determined from information or data as developed and distributed by the peripheral device 142 manufacturer or may be generated for a peripheral device 142 by the manufacturer in various embodiments.

Execution of code instructions for an ecosystem manageability sub-agent 172 on a user information handling system 100 may monitor for sets of peripheral device operational telemetry readings of a peripheral device workspace, such as time, applications currently executing or planned, hardware component usage metrics, connection type (e.g., wireless, wired, wireless wide area network (WWAN), wireless local area network (WLAN), wireless private area network (WPAN)), security credentials for the user, or environmental sensor readings (e.g., humidity, temperature, ambient light), among other possible peripheral device operational telemetry readings for the information handling system node 100 and peripheral device nodes 142 in a peripheral device workspace. These peripheral device operational telemetry readings associated with a peripheral device workspace identification value may be gathered routinely in telemetry measurements, or upon each startup of an anchor information handling system 100, for example. The ecosystem manageability sub-agent 172 executing at the information handling system 100 in a peripheral device workspace 101 may create a manifest of peripheral device nodes 142 and other nodes for a peripheral device workspace identification value to represent the current peripheral device workspace, including an identification of a location, identification of the user, and an identification (e.g., by product serial number or other peripheral device identification) of each of the peripheral device nodes 142 connected to or operably coupled to the anchor information handling system 100 or secondary information handling system nodes at a peripheral device workspace. Identification of the each of the peripheral device nodes 142 may include or be associated with an ODD in various embodiments herein.

Peripheral device operational telemetry readings gathered pursuant to execution of code instructions for an ecosystem manageability sub-agent 172 in an embodiment may include, for example, information specific to the information handling system 100, or the operative connection between the information handling system 100 and the peripheral devices 142, when in one or another peripheral device workspace. More specifically, the peripheral device operational telemetry readings gathered pursuant to execution of code instructions for the ecosystem manageability sub-agent may include, for the information handling system 100, a list of available wired or wireless communication protocols for operative coupling of one of the peripheral device nodes 142 with the information handling system 100 in a peripheral device workspace, a current power mode (e.g., sleep mode, battery mode, operational mode, powered down), range of possible power modes, current time, geographic location for the peripheral device workspace that includes the information handling system 100, current execution of a specific software application, hardware processor 102 or 104 utilization rate, memory 106, 108, or 120 utilization rate, remaining battery power for battery 124.

The peripheral device workspace anchor node in an embodiment may generate and transmit to the code instructions of a cloud manageability orchestrator module 166 executing at one or more peripheral device workspace cloud orchestrator servers 158 a peripheral device workspace anchor node status update document including manifest of peripheral devices in peripheral device workspace and collected peripheral device operation telemetry readings for a peripheral device workspace location identified by a location identifier. For example, code instructions for the ecosystem manageability sub-agent 172 executing at the information handling system 100 in a peripheral device workspace may create a manifest of peripheral device nodes 142 and other nodes for a peripheral device workspace identification value to represent the current peripheral device workspace, including an identification of the user, and an identification (e.g., by product serial number or other peripheral device identification) of each of the peripheral device nodes 142 connected to or operably coupled to the anchor information handling system 100 at a peripheral device workspace.

The hardware processor 102 of the user anchor information handling system 100 may execute code instructions of the ecosystem manageability sub-agent 172 to also collect one or more peripheral device operational telemetry readings (e.g., time, applications executing, hardware component usage metrics, or other telemetry data indicating usage patterns for the information handling system 100 or various peripheral devices 142 in a peripheral device workspace). The manifest of peripheral device nodes and other nodes as well as location of a peripheral device workspace described above may be combined with the peripheral device operational telemetry readings for the peripheral device workspace and an identification of the anchor node information handling system 100 user into a peripheral device workspace anchor node status update document written in a machine-readable language or machine markup language such as JavaScript Object Notation (JSON), for example, to be associated with a peripheral device workspace identification value.

This peripheral device workspace anchor node status update document is transmitted for storage with the peripheral device workspace identification value at a peripheral device workspace management system database 167 operating in the peripheral device workspace cloud orchestrator 156 and accessible by the one or more peripheral device workspace cloud orchestrator servers 158. Each time a peripheral device configuration setting is changed by the user, a new peripheral device is added to the peripheral device workspace, the peripheral device workspace anchor node information handling system moves to a new peripheral device workspace, or changes to peripheral device operational telemetry readings for the peripheral device workspace are detected, a new peripheral device workspace anchor node status update document including this updated configuration may be transmitted to the peripheral device workspace cloud orchestrator 156 for association with the peripheral device workspace identification value for the peripheral device workspace. Additionally, values for the ODD of each peripheral device in the manifest of peripheral devices in the peripheral device workspace may also be updated with these changes.

The peripheral device workspace management system database 167 may further store a user composite peripheral device workspace identifier that is unique to individual users of one or more defined peripheral device workspaces that are associated with identification of the user of the user's information handling system 100 and peripheral device workspace identification values of the peripheral device workspaces used by that user. Thus, a user composite peripheral device workspace identifier may identify a single user of an anchor node information handling system 100, and a peripheral device workspace identification value for each of one or more peripheral device workspaces in which the user's information handling system 100 operates as an anchor node at various times. The user composite peripheral device workspace identifier may thus be user-specific and user-centric. The peripheral device workspace identification value, in comparison, may define a location and list of peripheral device nodes 142, and may thus be peripheral device workspace-centric.

As described herein, when users shift from a first peripheral device workspace to a second peripheral device workspace, there is often a mismatch between the communication protocols available for operative coupling between a plurality of peripheral devices such as 142 at these first and second peripheral device workspaces. As such, the choice of communication protocols for links among peripheral devices 142 that is suited to meet critical level operational requirements within each of the peripheral devices' respective capabilities within the first peripheral device workspace may not match the best choice of communication protocols for those links within the second peripheral device workspace. Code instructions for the peripheral device capability aware communication protocol selection module 169 executing on a peripheral device workspace maintenance cloud server 158 may be executed each time a user joins a new peripheral device workspace to determine availability of wired and wireless protocols for establishing communication links between peripheral devices 142 within the new peripheral device workspace, determine capabilities of each of these peripheral devices 142 according to each currently available communication protocol, and for each peripheral device 142, to identify, recommend, or automatically establish a link according to the communication protocol associated with suited to meet critical level operational requirements from capabilities for that peripheral device 142 for use in the new peripheral device workspace, as described in greater detail below with respect to FIGS. 3 and 4.

When referred to as a "system," a "device," a "module," a "controller," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCM-CIA) card, or other such expansion card), or a system (such as a motherboard, a system-on-a-chip (SoC), or a stand-alone device). The system, device, controller, or module can include hardware processing resources executing software, including firmware embedded at a device, such as an Intel® brand processor, AMD® brand processors, Qualcomm® brand processors, or other processors and chipsets, or other such hardware device capable of operating a relevant software environment of the information handling system. The system, device, controller, or module can also include a combination of the foregoing examples of hardware or hardware executing software or firmware. Note that an information handling system can include an integrated circuit or a board-level product having portions thereof that can also be any combination of hardware and hardware executing software. Devices, modules, hardware resources, or hardware controllers that are in communication with one another need not be in continuous communication with each other, unless expressly specified otherwise. In addition, devices, modules, hardware resources, and hardware controllers that are in communication with one another can communicate directly or indirectly through one or more intermediaries.

Figure 2:
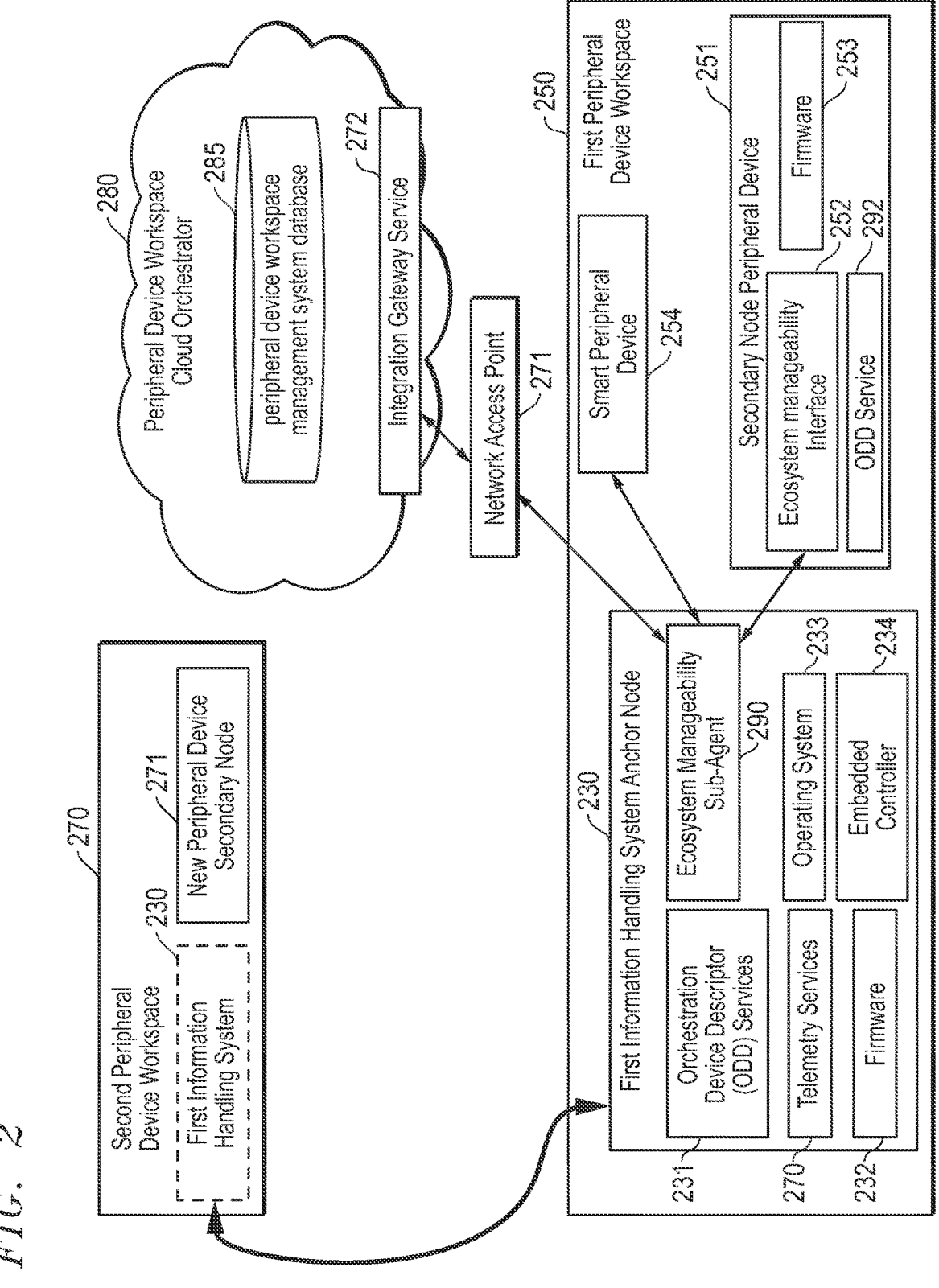
FIG. 2 is a block diagram illustrating a cloud-based peripheral device workspace cloud orchestrator for defining a first peripheral device workspace including an anchor user information handling system node and peripheral device nodes according to an embodiment of the present disclosure.

FIG. 2 is a block diagram illustrating a cloud-based peripheral device workspace cloud orchestrator executing at one or more peripheral device workspace cloud orchestrator servers for defining a first of a plurality of peripheral device workspaces in which a user information handling system operatively couples with a first plurality of peripheral devices according to an embodiment of the present disclosure. As described previously, a user may oftentimes use an information handling system 230 in a peripheral device workspace 250. In this context, a peripheral device workspace 250 or 270 can be viewed as an environment with a location identifier that includes the user information handling system 230 (e.g., a laptop) operating as a primary or anchor node for the peripheral device workspace 250 and peripheral devices 251 and 254 operating as secondary nodes of the peripheral device workspace 250 that are connected to the user information handling system 230. A peripheral device workspace 250 or 270 may be associated with a peripheral device workspace identification value, a location identification, and a manifest of nodes including an anchor information handling system node 230, peripheral device nodes (e.g., 251 or 271), and any other nodes (e.g., smart peripheral device node 254). The peripheral device workspace identification values and associated data for peripheral device workspaces 250 or 271 may be defined by execution of code instructions of the peripheral device workspace cloud orchestrator 280 executing at one or more peripheral device workspace cloud orchestrator servers and stored in a peripheral device workspace management system database 285.

The code instructions of the peripheral device workspace cloud orchestrator 280 and its various software modules executing at one or more peripheral device workspace cloud orchestrator servers manage a plurality of peripheral device workspaces 250 or 270 and their nodes, including peripheral device nodes, across an enterprise according to embodiments herein. For example, code instructions of an ecosystem manageability service module may execute to monitor and obtain operational telemetry data from peripheral device nodes and other nodes in peripheral device workspaces 250 or 270. A peripheral device operational telemetry reading may include, for example, location, time of day, applications being executed, wireless or wired connection capabilities, or security credentials for the user. Peripheral devices 251 and 254 may commonly include internal or external devices such as displays, a keyboard, a mouse, a webcam, a printer, a speaker, a fingerprint scanner, etc. According to various embodiments herein, a peripheral device workspace 250 or 270 may include a wired or wireless dock by which the user information handling system 230 connects to some or all the peripheral devices including smart peripheral devices such as 254 having some compute or input/output capabilities. Peripheral device 254 in an example embodiment may considered a "smart" peripheral device because it may operate an agent or firmware, and include a network interface device or wireless receiver that makes the smart peripheral device 254 capable of direct communication with the cloud-based peripheral device workspace cloud orchestrator 280 via the integration gateway services 272 and the network access point 271 for some subset of secondary nodes. Similarly, a primary or anchor node information handling system 230 is also capable of direct communication with the cloud-based peripheral device workspace cloud orchestrator 280 execution on hardware processors of one or more peripheral device workspace cloud orchestrator servers via the integration gateway services 272 and the network access point 271 for some or all secondary nodes in the peripheral device workspace 250 or 270.

A peripheral device workspace 250 or 270 in embodiments may be used for hybrid work scenarios. For example, a business may have an office space that includes hoteling cubes that can be assigned to, reserved by, or otherwise utilized by the business's employees as peripheral device workspaces 250 or 270. In such cases, the business may allow its employees to connect their laptops (e.g., 230) to a dock (e.g., 254) in a particular hoteling cube where various peripherals (e.g., 251) may be available for use. A business may also have a collaborative peripheral device workspace that may be a conference room or meeting room where plural users with plural anchor node information handling systems 230 utilize some or all peripheral device nodes in that peripheral device workspace at the same time. Users may also employ peripheral device workspaces 250 or 270 when working from home or other locations.

When a user employs multiple peripheral device workspaces 250 or 270 (e.g., by connecting a laptop to different combinations of peripheral devices during a workday), it can be tedious for the user to configure the peripheral device workspaces 250 or 270 to his or her preferences. For example, while using a first peripheral device workspace 250, the user may set configurations for the peripheral devices 251 and 254 of the peripheral device workspace 250 to match the user's preferences or they may be configured to meet an operating policy set for a given peripheral device workspace. If the user switches to a different peripheral device workspace 270, those configurations may not be consistent with the peripheral devices such as 271 of the different peripheral device workspace 270 or may result in unintended changes. The user may therefore have to manually reconfigure the peripheral devices such as 271 within the peripheral device workspace 270.

Execution of code instructions for an ecosystem manageability sub-agent 290 on a user information handling system 230 monitor telemetry readings taken by a telemetry service 270 for peripheral device operational telemetry readings of a peripheral device workspace, such as time, location, applications currently executing or planned, connection type (e.g., wireless, wired, wireless wide area network (WWAN), wireless local area network (WLAN), wireless private area network (WPAN)), security credentials for the user, or environmental sensor readings (e.g., humidity, temperature, ambient light), among other possible telemetry readings for the information handling system 230. These telemetry measurements may be gathered routinely, or upon each startup of an information handling system 230, for example.

Code instructions for the ecosystem manageability sub-agent 290 in an embodiment may execute to gather, via an ecosystem manageability interface 252 at one or more secondary node peripheral devices, such as 251, various peripheral device operational telemetry readings describing operational capabilities for the one or more secondary node peripheral devices within the peripheral device workspace 250. For example, the code instructions for the ecosystem manageability sub-agent 290 operating at the anchor node 230 may execute to gather peripheral device operational telemetry readings regarding the range of capabilities for each peripheral device (e.g., 251 and 254). The information defining the range of functional capabilities for the peripheral device 251 may be stored at the peripheral device 251, within the firmware 253, or at an orchestration device descriptor (ODD) service 292. In an embodiment, the ODD service 292 the peripheral device 251 may also store static or non-adjustable features for the peripheral device 251, such as locations for various ports, physical dimensions of the new peripheral device 251, or physical locations for internal components such as an embedded camera. Model number, device number, media access control (MAC) address, or other identifying information for the peripheral device 251 may also be stored within the ODD service 292, or similar identifying information for the peripheral device 251 in an embodiment may be stored within firmware 253.

Each peripheral device 251 or 254 within a peripheral device workspace 250, or peripheral device 271 within a peripheral device workspace 270 may be associated with an orchestrated device descriptor (ODD) which includes a description of all non-configurable aspects of the peripheral device 251, 254, or 271, respectively, such as a list of communication protocols supported by the peripheral device 251, 254, or 271, respectively, minimum or maximum performance capabilities for each communication protocol, and average power consumption associated with links established according to each of those communication protocols. The minimum or maximum performance capabilities for each communication protocol listed within an ODD for a given device may be, for example, a relative signal strength indicator (RSSI), range, throughput, latency, dropped packets, or any other key performance indicator (KPI) for communications or other hardware component operational performance listed within performance specifications for that device 251, 254, or 271, respectively, as developed and distributed by the peripheral device manufacturer.

The ecosystem manageability sub-agent 290 of the anchor node information handling system 230 may execute code instructions in an embodiment to retrieve the functional capabilities for the peripheral device 251 from the firmware 253 via communication with the ecosystem manageability interface 252, which may act as an application programming interface (API), for example, between the firmware 253 and the ecosystem manageability sub-agent 290. The ODD may include a unique peripheral device identification as well as an environmental telemetry data set describing the peripheral device operational telemetry readings regarding the range of capabilities for each peripheral device (e.g., 251 and 254).

Each peripheral device, such as 251 may include a range of capabilities, and the user may choose to configure the peripheral device 251 to operate according to a selected setting or configuration within this range of capabilities. For example, in an embodiment in which the peripheral device 251 is an external display device, the peripheral device 251 may be capable of operating within a range of functional capabilities defining the display resolution, such as between a resolution of 640×480 pixels, which may be the lowest resolution supported by the operating system 233, and 3840×2160 pixels, which is the standard resolution for 4K Ultra-High Definition (4K UHD) monitors. Thus, the functional capabilities for the peripheral device 251 in such an example may be the entire range between 640×480 pixels and 3840×2160 pixels. The user may select an adjustable operational configuration for the peripheral device 251 by choosing one available resolution within this range of 620× 480 pixels and 3840×2160 pixels. This may be done by the user, for example, through a "preferences," "properties," or "settings" user interface within the operating system 233. Because the user may choose one of several available configurations within the range of functional capabilities, the chosen configuration may be referred to herein as an adjustable operational configuration that may be selected by the user. In some cases, the peripheral device 251 may be preset with a default configuration. These default configurations may also be considered adjustable operational configurations herein, in that the user has the opportunity to adjust such a default configuration through the "preferences," "properties," or "settings" user interface within the operating system 233. In such a way, the peripheral device 251 may be configured according to a user-selectable, adjustable operational configuration that lies within a range of functional capabilities for the peripheral device.

Other capabilities may include connectivity capabilities for a peripheral device 251, such as types of wired connectors or wireless protocols available configuration may include selection of connectivity type as well as speeds, bandwidths, throughput or the like available. For example, each peripheral device, such as 251, 254, or 271 may include a range of available communication protocols according to which the peripheral device 251, 254, or 271 may establish a wired or wireless communication link to operatively couple with the anchor information handling system node 230. More specifically, peripheral devices 251, 254, or 271 in an example embodiment may be capable of establishing a wired communication link with the information handling system 230 according to a Universal Serial Bus (USB) communication protocol, such as USB 2.0, USB 3.0, or USB-C. In another example, peripheral devices 251, 254, or 271 in an example embodiment may be capable of establishing a wireless communication link with the information handling system 230 according to Wireless Local Area Network (WLAN) or Wireless Wide Area Network (WWAN) communication protocols, which may include Wi-Fi. In still other examples, peripheral devices 251, 254, or 271 in an example embodiment may be capable of establishing a wireless communication link with the information handling system 230 according to Wireless Private Area Network (WPAN) communication protocols, such as Bluetooth®, Bluetooth® Low Energy (BLE), or Wi-Fi Direct®.

The anchor node information handling system node 230 in an embodiment may also include a hardware processor, embedded controller 234 or other hardware processing resource executing code instructions of the ecosystem manageability sub-agent 290. The anchor node 230 in an example embodiment may be operatively coupled to a secondary node peripheral device 251, which may further include a microcontroller executing code instructions of an ecosystem manageability interface 252 and firmware 253. The ecosystem manageability 252 in an embodiment may facilitate communication between the ecosystem manageability sub-agent 290 and the firmware 253 for the secondary node peripheral device 251. Although not shown in FIG. 2, the smart peripheral devices 254 and 271 may further include internal components, such as hardware processing resources or network interface capabilities, facilitating communication of telemetry measurements for the peripheral devices 254 or 271 to the ecosystem manageability sub-agent 290 or even directly with one or more peripheral device workspace cloud orchestrator servers executing the peripheral device workspace cloud orchestrator 280.

The ecosystem manageability sub-agent 290 in an embodiment may gather, via ecosystem manageability interface 252, various peripheral device operational telemetry data readings describing adjustable configurations for the secondary node peripheral devices 251, 254, or 271 within the peripheral device workspaces 250 or 270, respectively, some embodiments. For example, in an embodiment in which the peripheral device 251 is an external display device, the ecosystem manageability sub-agent 290 may gather telemetry information including a current adjustable operational configuration at the peripheral device 251 for display resolution, display refresh rate, brightness, contrast, color gamut, horizontal view angle, vertical view angle, and response time. As another example, in an embodiment in which the peripheral device 251 is an external webcam, the ecosystem manageability sub-agent 290 may gather telemetry information including a current adjustable operational configuration at the peripheral device 251 for audio/visual connection type (e.g., HDMI, digital audio, wireless, etc.), video capture resolution, image depth, video capture refresh rate, or captured frames per second. In still another example, in an embodiment in which the peripheral device 251 is an external microphone, the ecosystem manageability sub-agent 290 may gather telemetry information including a current adjustable operational configuration at the peripheral device 251 for audio output type, audio output frequency, or audio filters (e.g., noise reduction). In yet another example embodiment, in which the peripheral device 251 is an external speaker, the ecosystem manageability sub-agent 290 may gather telemetry information including a current adjustable operational configuration at the peripheral device 251 for audio input type, audio input frequency, or connectivity type. In yet another example embodiment, in which the peripheral device 251 is mouse, touchpad, touchscreen, or keyboard, the ecosystem manageability sub-agent 290 may gather telemetry information including a current adjustable operational configuration at the peripheral device 251 for polling rate, keystroke or button detection, sensitivity levels, power source levels, connectivity type and other settings. Other types of peripheral devices 251 are also contemplated and may include relevant current adjustable operational configuration telemetry data as peripheral device operational telemetry readings for any peripheral device types, including or connectivity types, as described in embodiments herein. A similar method of gathering telemetry for a smart peripheral device 254, or node 271 may also be performed via the ecosystem manageability sub-agent 290 in an embodiment.

The ecosystem manageability sub-agent 290 executing at the information handling system 230 may create a manifest listing each of the peripheral device nodes 251 and 254 within the peripheral device workspace 250, as well as the anchor node 230. When the anchor node 230 joins the second peripheral device workspace 270, the ecosystem manageability sub-agent 290 executing at the information handling system 230 may create a manifest listing the peripheral device node 271 within the peripheral device workspace 270, as well as the anchor node 230. The manifest of peripheral device nodes 251 and 254 and other nodes 230 as well as location of a peripheral device workspace 250 may be combined with the peripheral device operational telemetry readings for the peripheral device workspace 250 for capabilities and configuration settings and an identification of the anchor node information handling system 230 user into a peripheral device workspace anchor node status update document written in a machine-readable language or machine markup language such as JavaScript Object Notation (JSON), for example, for the peripheral device workspace. When the information handling system 230 joins the second peripheral device workspace 270, the manifest of peripheral device nodes 271 and other nodes 230 as well as location of a peripheral device workspace 270 may be combined with the peripheral device operational telemetry readings for the peripheral device workspace 270 for capabilities and configuration settings and an identification of the anchor node information handling system 230 user into a similarly formatted peripheral device workspace anchor node status update document. The peripheral device workspace anchor node status update document is transmitted for storage with the peripheral device workspace identification value at a peripheral device workspace management system database 285 operating in the peripheral device workspace cloud orchestrator 280 executing at one or more peripheral device workspace cloud orchestrator servers. Each time a peripheral device configuration setting is changed by the user, a new peripheral device is added to the peripheral device workspace such as 250 or 270, the information handling system 230 moves from a first peripheral device workspace 250 to a second peripheral device workspace 270, or changes to peripheral device operational telemetry readings for the peripheral device workspace 250 or 270 are detected, a new peripheral device workspace 250 or 270 anchor node status update document including this updated configuration may be transmitted to the peripheral device workspace cloud orchestrator 280.

The anchor node information handling system 230 in an embodiment may be operatively connected to the internet via a network access point (AP) 271a, which may further connect to one or more cloud-based applications, servers, or systems. Such cloud-based applications in an embodiment may include execution of code instructions of the peripheral device workspace cloud orchestrator 280 at one or more peripheral device workspace cloud orchestrator servers which communicates with the remote anchor node information handling system 230 in various peripheral device workspaces 250 and 270, respectively, via an integration gateway service 272. The integration gateway service 272 in an embodiment may operate as an Application Programming Interface (API) or a Query Language (QL) supervisor to control communications to and from the peripheral device workspace cloud orchestrator 280, for example. More specifically, the integration gateway service 272 may, via an API, control the query language in which queries are made to the peripheral device workspace cloud orchestrator 280. As another example, the integration gateway service 272 may use a query language supervisor, such as GraphQL® to control such queries and the format in which results are provided by the peripheral device workspace cloud orchestrator 280. The anchor node 230 may communicate gathered peripheral device telemetry, as well as telemetry specific to the anchor node 230 itself, to the peripheral device workspace cloud orchestrator 280 via this integration gateway service 271a.

Various peripheral device workspaces (e.g., 250 and 270) may be defined by location indicator detected for an anchor node information handling system 230 operating at the peripheral device workspace 250, and a manifest of nodes of peripheral devices 251 and smart devices 254 that may operate in the peripheral device workspace 250. Each such defined peripheral device workspace 250 or 270 may also be assigned a peripheral device workspace identification value which may be stored and associated with stored manifests of nodes 230, 251, and 254 operating in the peripheral device workspace 250. Additional peripheral device operational telemetry readings for the peripheral device workspace 250 may be stored within one or more peripheral device workspace anchor node status update documents as well as included in the definition of the peripheral device workspace and associated with its peripheral device workspace identification value defined at the peripheral device workspace cloud orchestrator 280 and server database 285, including peripheral device capabilities, peripheral device connectivity details, current peripheral device configurations or settings, peripheral device setting or configuration options, current status of the peripheral devices 230, 251, and 254, within the peripheral device workspace 250, and other features of nodes 230, 251, and 254 within the peripheral device workspace 250. For example, the definition of the peripheral device workspace 250 associated with a specific peripheral device workspace identification value may include a set of peripheral device operational telemetry readings and stored within one or more peripheral device workspace anchor node status update documents, such as time, applications currently executing or planned, connection type, hardware component capabilities or usage metrics, or environmental sensor readings (e.g., humidity, temperature), among other possible peripheral device operational telemetry readings for an anchor node information handling system 230 operating within the defined peripheral device workspace 250.

A peripheral device workspace 250 may be defined by a location, a list of peripheral devices 251 and 254 operatively coupled to an anchor node information handling system 230 for a user, type of peripheral device workspace (e.g., personal, hoteling office/shared, or collaborative), and additionally in some cases, by one or more of the peripheral device operational telemetry readings for the peripheral device workspace 250 described herein. Each of these defining factors may be associated in a database memory 285 for the peripheral device workspace cloud orchestrator 280 with the peripheral device workspace identification value, which may also be associated with one or more peripheral device operational configuration policies describing how the nodes 230, 251 and 254 within the defined peripheral device workspace 250 are to operate. Thus, a particular peripheral device operational configuration policy for one or more peripheral device nodes 251 or 254 within a given peripheral device workspace 250 having a peripheral device workspace identification value may apply only when certain peripheral device operational telemetry readings, such as telemetries describing usage patterns for those peripheral device nodes 251 or 254 are detected. In such a way, the peripheral device operational configuration policy for a peripheral device such as 251 or 254 within a peripheral device workspace 250 may be defined or associated with particularly defined usage patterns for that peripheral device. For example, a peripheral device operational configuration policy may apply only when certain software applications are executing at the anchor node information handling system 230 defined within the peripheral device workspace 250, or when one or more hardware components' (e.g., graphics processing unit (GPU), central processing unit (CPU), memory) usage metrics or connectivity metrics meet a predefined threshold.

A database memory 285 for the peripheral device workspace cloud orchestrator 280 may further store a user composite peripheral device workspace identifier that is unique to individual users of one or more defined peripheral device workspaces 250 or 270 that are associated with identification of the user of the user's information handling system 230 and peripheral device workspace identification values of the peripheral device workspaces 250 or 270 used by that user. Thus, a user composite peripheral device workspace identifier may identify a single user of an anchor node information handling system 230, and a peripheral device workspace identification value for each of one or more peripheral device workspaces 250 or 270 in which the user's information handling system 230 operates as an anchor node at various times. The user composite peripheral device workspace identifier may thus be user-specific and user-centric. The peripheral device workspace identification value, in comparison, may define a location and list of peripheral device nodes, and may thus be peripheral device workspace-centric.

As described herein, when users shift from a first peripheral device workspace 250 to a second peripheral device workspace 270, there is often a mismatch between the communication protocols available for operative coupling between a plurality of peripheral devices 251 and 254 at the first peripheral device workspace 250 and the second peripheral device workspace 270. As such, the choice of communication protocols for links among peripheral devices such as 251 or 254 that is best suited for each of the peripheral devices' respective capabilities within the first peripheral device workspace 250 may not match the best choice of communication protocols for a link with peripheral device 271 within the second peripheral device workspace 270. Code instructions for the peripheral device capability aware communication protocol selection module operating on a peripheral device workspace cloud orchestrator 280 may be executed each time a user joins a new peripheral device workspace, such as 270, to determine availability of wired and wireless protocols for establishing communication links between peripheral devices, such as 271 within the new peripheral device workspace 270, determine capabilities of each of these peripheral devices such as 271 according to each currently available communication protocol, and for each peripheral device such as 271, to identify, recommend, or automatically establish a link according to the communication protocol associated with best capabilities for that peripheral device 271, as described in greater detail below with respect to FIGS. 3 and 4.

Figure 3:
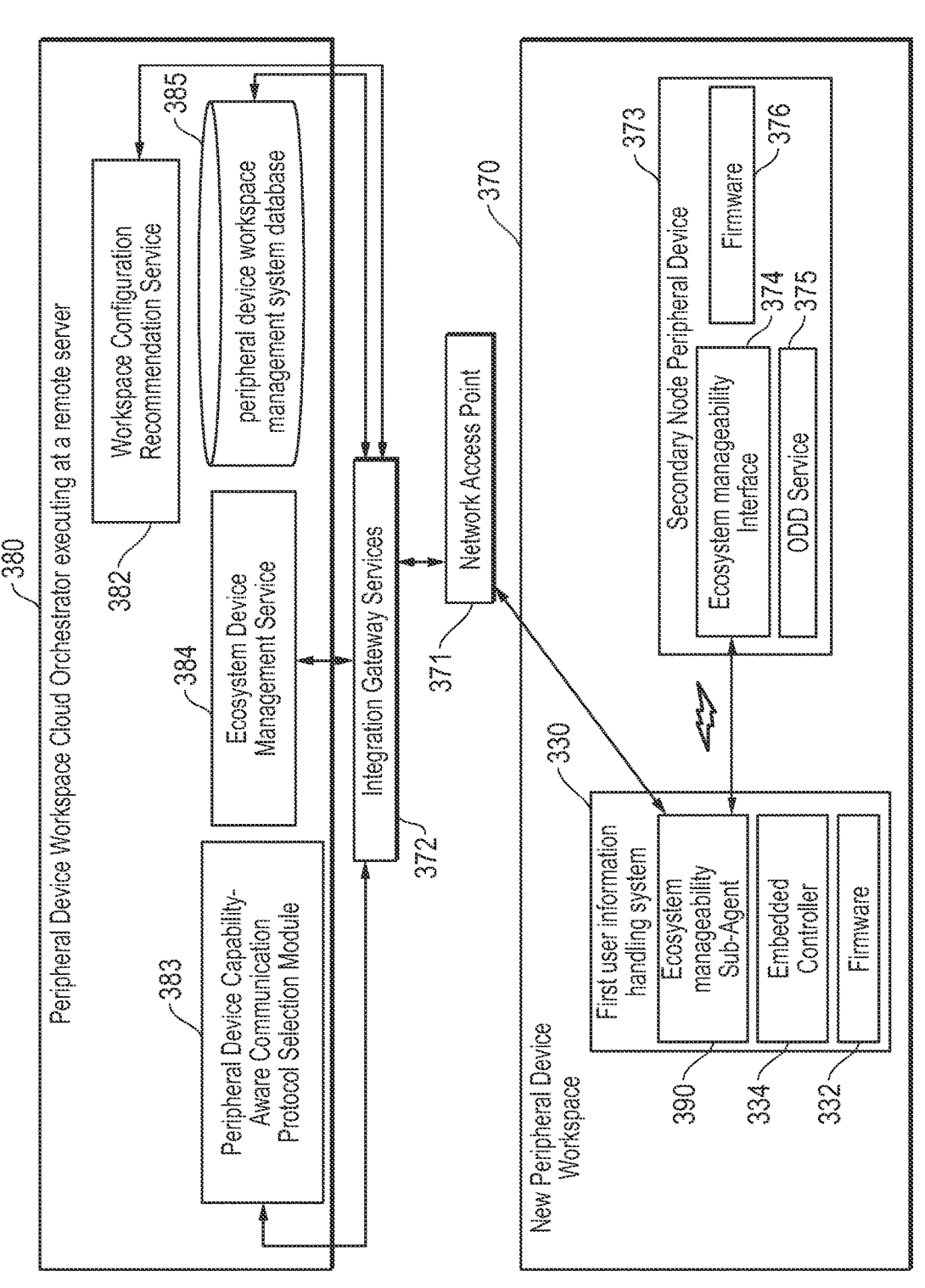
FIG. 3 is a block diagram illustrating a new peripheral device node in a new peripheral device workspace interfacing with a peripheral device workspace cloud orchestrator server to be automatically configured for a communication protocol best-suited for a user's current usage pattern according to an embodiment of the present disclosure.

FIG. 3 is a block diagram illustrating code instructions for a peripheral device workspace cloud orchestrator executing at a remote peripheral device workspace cloud orchestrator server or servers for automatically configuring a new peripheral device for a communication protocol best-suited for a user's current usage pattern, as defined by received peripheral device operational telemetry measurements and peripheral device functional capabilities for a peripheral device within the current peripheral device workspace according to an embodiment of the present disclosure. As described herein, when users shift from a first peripheral device workspace (e.g., 250 from FIG. 2) to a second peripheral device workspace 370, there is often a mismatch between the communication protocols available for operative coupling between a plurality of peripheral devices at the first peripheral device workspace and the second peripheral device workspace 370. As such, the choice of communication protocols for links among peripheral devices that is best suited for each of the peripheral devices' respective capabilities within the first peripheral device workspace (e.g., 250 from FIG. 2) may not match the best choice of communication protocols for a link with peripheral device node 373 within the second peripheral device workspace 370. Code instructions for the peripheral device capability aware communication protocol selection module 383 operating on a peripheral device workspace cloud orchestrator 380 may be executed each time a user joins a new peripheral device workspace, such as 370, to determine availability of wired and wireless protocols for establishing communication links between peripheral devices, such as 371 within the new peripheral device workspace 370, determine capabilities of each of these peripheral devices such as 371 according to each currently available communication protocol, and for each peripheral device such as 371, to identify, recommend, or automatically establish a link according to the communication protocol associated with best capabilities for that peripheral device node 373.

When the user information handling system 330 transfers to the new peripheral device workspace 370 (from the first peripheral device workspace 250 described with reference to FIG. 2), the user information handling system 330 or a smart peripheral device (not shown) acting as the anchor node for the new peripheral device workspace 370 may transmit an updated peripheral device workspace anchor node status update document. The updated peripheral device workspace anchor node status update document may be transmitted to the peripheral device workspace cloud orchestrator 380 and its ecosystem device management service 384 executing on one or more peripheral device workspace orchestrator servers for storage at the peripheral device workspace management system database 385. In an embodiment, the updated peripheral device workspace anchor node status update document may provide a user composite peripheral device workspace identifier for the user of the information handling system 330, a manifest of the information handling system 330 acting as the anchor node for the peripheral device workspace 370, a peripheral device workspace identification value for the peripheral device workspace 370, and identification of the new peripheral device secondary node 373, along with a location indicator, as well as various other peripheral device operational telemetry readings, as described herein.

Code instructions for the peripheral device capability-aware communication protocol selection module 383 in an embodiment may execute as part of the peripheral device workspace orchestrator 380 at the peripheral device workspace orchestrator servers to determine a minimum or maximum peripheral device functional capability for each available communication protocol as listed within an ODD for a given peripheral device node 373. Execution of code instructions for the peripheral device capability-aware communication protocol selection module 383 may further generate and insert these values into a peripheral device protocol and capabilities table, such as the example Table 1 below. More specifically, code instructions of the peripheral device capability aware communication protocol selection module 383 may execute to generate a peripheral device protocol and capabilities table that lists each of the communication protocols currently available for operative coupling among peripheral devices, including 371, as drawn from recently received peripheral device workspace primary node status update document or documents, and, for each of these available protocols, a minimum or maximum performance capability for each communication protocol, as listed within an ODD for a given device, such as 371.

TABLE 1

| Available Communication Protocols | Minimum RSSI | Maximum Range (m) | Latency (ms) | Throughput (Mbps) | Power Consumption for Maximum Peripheral Device Functional Capability (W) |
|---|---|---|---|---|---|
| Wi-Fi | −40 | 20 | 1 | 600 | 2 |
| Bluetooth ® | −10 | 5 | 35 | 25 | 1 |
| Universal Serial Bus | N/A | 0.6 | 5 | 60 | 0.5 |

As described herein, the communication protocol-dependent peripheral device functional capabilities listed within the peripheral device protocol and capabilities table, such as Table 1 above, may include, for example, a relative signal strength indicator (RSSI), range, throughput, latency, dropped packets, or any other key performance indicator (KPI) listed within performance specifications for that device 371, as developed and distributed by the peripheral device manufacturer, and given within the ODD for the peripheral device node 373. As also described herein, each peripheral device, such as 371 within a peripheral device workspace 370 may be associated with an orchestrated device descriptor (ODD) which includes a description of all non-configurable aspects of the peripheral device node 373, such as a list of communication protocols supported by the peripheral device node 373, minimum or maximum performance capabilities for each communication protocol, and maximum power consumption for one or more selected peripheral device functional capabilities that meet a critical operational requirement associated with links established according to each of those communication protocols for operation of software code instructions by the anchor information handling system 330 with a peripheral device node 373 or other nodes within a peripheral device workspace. For example, the minimum or maximum performance capabilities for each communication protocol listed within an ODD for a given device or node may include, for example, a relative signal strength indicator (RSSI), range, throughput, latency, dropped packets, or any other key performance indicator (KPI) listed within performance specifications for that device, as developed and distributed by the peripheral device manufacturer, that may meet environmental context data of critical operation requirements for an anchor node information handling system 330 with a peripheral device node 373 or other node and the existing communication environment of the anchor node information handling system 330 with other peripheral device nodes (not shown) in the peripheral device workspace 370.

A selected peripheral device functional capability in this context may describe a highest possible functional capability where a maximum is most desirable for critical operational requirements of the anchor information handling system node 330 executing software code instructions requiring peripheral device node 373 in the peripheral device workspace 370. For example a selected peripheral device functional capability with a maximum, such as a video resolution, refresh rate, color gamut, video capture frames per second, image depth, or response time for an external display peripheral device node or for an external webcam node, that serves as secondary peripheral device node 373, may be a critical requirement for execution of a teleconferencing software application or a graphics-intensive design software application by the anchor information handling system node 330. Another example of a selected peripheral device functional capability in this context for critical operational requirements of the anchor information handling system node 330 may describe a maximum achievable polling rate or sensitivity level for a mouse, touchpad, touchscreen, or keyboard peripheral device as secondary peripheral device 373 when an anchor information handling system node 330 is executing a gaming software application. Still another example of a selected peripheral device functional capability in this context for critical operational requirements of the anchor information handling system node 330 may describe a minimum keystroke or button detection response time for a mouse, touchpad, touchscreen, or keyboard peripheral device for efficiency for word processing applications or for a gaming application executing at the anchor information handling system node 330 in a peripheral device workspace 370. Yet another example of a select peripheral device functional capability for critical operational requirements may describe turning on one or more audio or video filters such as noise reduction or application of a background in a video image may be a critical operational requirement for execution of a teleconferencing software application by the anchor information handling system node 330 for a peripheral device workspace 370 identified as a home office. As described herein, each ODD for each peripheral device such as 371 may also include power consumption per watt for each of these selected functional capabilities when battery power levels are a consideration of optimizing peripheral device functional capabilities.

Relating to the connectivity of a peripheral device node 373 to the anchor information handling system node 330 in a peripheral device workspace 370, the ODD for the peripheral device node 373 may provide for connectivity options, both wired and wireless, as well as functional capabilities of those connectivity options. The ODD for the peripheral device 373 in an embodiment may describe a Wi-Fi wireless connectivity option with a minimum achievable RSSI of −40, a maximum achievable range of 20 meters, a minimal latency of one millisecond (ms), a maximum throughput of 600 Mbps, and an average of two watts consumed to transmit at a 4K UHD video resolution when operatively coupled via the Wi-Fi wireless communication link. In another example, the ODD for the peripheral device node 373 in an embodiment may describe a minimum achievable RSSI of −10, a minimal latency of 35 ms, a maximum throughput of 25 Mbps, a maximum achievable range of 5 meters, and an average of one watt consumed to transmit at a 2K UHD video resolution when operatively coupled via a Bluetooth® wireless communication link. In still another example, the ODD for the peripheral device node 373 in an embodiment may describe a maximum achievable range of 0.6 meters, a minimal latency of 5 ms, a maximum throughput of 60 Mbps, and an average of 0.5 watts to transmit at a 720×1280 pixel (720p) standard resolution when operatively coupled via a USB wired communication link.

The peripheral device protocol and capabilities table in embodiments may thus indicate, for each of the peripheral device nodes, including 373, within the peripheral device workspace 370, available function capabilities for each available communication protocol for each peripheral device node 373 within the current peripheral device workspace 370. In a specific example, Table 1 above may be generated for an external video display peripheral device that is capable of receiving and displaying video at varying levels of resolution, and consuming varying levels of power, depending on the communication protocol used to establish an operative coupling with an anchor information handling system node 330 supplying the video. More specifically, Table 1 above may include KPIs, such as minimum achievable RSSI and maximum achievable range, throughput, latency, and other communication KPIs, for each of the available communication protocols within which the external video display peripheral device, such as peripheral device node 373, is capable of establishing links to the anchor information handling system node 330. In addition, Table 1 may include a column furthest to the right indicating that receiving video at a 4K UHD video resolution, which may be the highest resolution achievable using the Wi-Fi communication protocol may consume two watts of power. The column furthest to the right may also indicate that receiving video at the 2K HD video resolution, which may be the highest resolution achievable using the Bluetooth® communication protocol may consume one watt of power. The column furthest to the right may also indicate that receiving video at the 720×1080 (720p) standard video resolution, which may be the highest resolution achievable using the USB communication protocol may consume one half watt of power. Other embodiments contemplated herein may list various other KPIs within the peripheral device protocol and capabilities table, and may provide a per watt power consumption value for other KPIs, depending upon various received peripheral device workspace operational telemetry readings indicating a current workload or usage pattern for the peripheral device node 373 and its operatively coupled anchor information handling system(s) node 330, as described below with respect to the communication protocol and usage pattern rules table.

Code instructions for the peripheral device capability aware communication protocol selection module 383 in an embodiment may execute at one or more peripheral device workspace cloud orchestrator servers to retrieve a communication protocol and usage pattern rules data, for example in a table format in one embodiment, from storage database 385 used for identifying a most critical or a ranking of criticality for one or more key performance indicators (KPIs) corresponding to the peripheral device functional capabilities listed for one or more components or features of the peripheral device node 373 within the peripheral device protocol and capabilities table (e.g., Table 1 above). Such determinations of a most critical or a ranking of criticality for one or more key performance indicators (KPIs) corresponding to the peripheral device functional capabilities listed for one or more components or features of the peripheral device node 373 may be determined from one or more peripheral device operational telemetry readings for the peripheral device node 373 or the information handling system 330 as well as ODD data for nodes such as anchor information handling system 330 and peripheral device node 373. As described in greater detail above with respect to FIG. 1, an information technology decision maker (ITDM) for an enterprise may provide, at least in part, such a communication protocol and usage pattern rules data, for example in a table format in one embodiment (e.g., Table 2 below), to the peripheral device workspace cloud orchestrator 156 via the console 160 graphical user interface as operational policy rules for an enterprise. Other communication protocol and usage pattern rules data may be determined directly from application software requirements or other sources. The communication protocol and usage pattern rules data in such an example embodiment may associate one or more peripheral device operational telemetry readings, which may include telemetry readings for the information handling system 330 or the peripheral device 373 in embodiments, as one or more critical KPIs for critical functional requirements of the executing software application and the environmental conditions in the peripheral device workspace. This may be done in order to define a selected critical functional capability from a ranked or weighted list of priorities for peripheral device functional capabilities based on a detected usage pattern or current workload by the anchor information handling system 330 and its use of a peripheral device node 373 as well as existing or other connectivity of nodes within the peripheral device workspace 370, as reflected in the received peripheral device operational telemetry readings.

For example, the execution of code instructions of the peripheral device capability-aware communication protocol selection module at the peripheral device workspace cloud orchestrator servers may utilize communication protocol and usage pattern rules data to identify, rank, or weigh various KPIs from workspace telemetry readings data that are most critical during execution of a specific software application at the anchor information handling system 330 with which the peripheral device 373 will be used at a peripheral device workspace 370 to determine which of via one or more available communication protocols to select for communications. More specifically, an execution of code instructions of the peripheral device capability-aware communication protocol selection module at the peripheral device workspace cloud orchestrator servers may identify, rank, or weigh various KPIs, such as latency and throughput that are most critical during execution of a software application at the information handling system 330 involving transmission, receipt, or display of high-definition video. The criticality of these KPIs may be defined and drawn from minimum system requirements for a given software applications in some embodiments. In other embodiments, the critical KPIs may be defined according to the peripheral device node 373 in use with the anchor information handling system node 330. For example, execution of code instructions of the peripheral device capability-aware communication protocol selection module at the peripheral device workspace cloud orchestrator servers may identify, rank, or weigh various KPIs, such as latency and range that are determined to meet critical requirements of operational performance during use of an external headset or an external video projector for a conference room. In both of these scenarios, the information handling system 330 to which the peripheral device node 373 may pair or operatively connect may need to be located further from the peripheral device node 373 than in a traditional desktop or cubicle setting. In still other embodiments, criticality of KPIs to meet critical requirements of operational performance for the anchor information handling system node 330 operating with the peripheral device node 373 may be defined according to a power state of the information handling system 330 or the peripheral device 373. For example, the communication protocol and usage pattern rules data may define low power consumption as a critical KPI for operational performance in an embodiment in which a low-power mode is detected at the information handling system 330 or the peripheral device 373.

The communication protocol and usage pattern rules data may list one or more critical KPIs in association with one or more peripheral device operational telemetry readings such as within the communication protocol and usage pattern rules table, as shown in Table 2 below, in one example embodiment. Although a table is shown for explanatory purposes, the communication protocol and usage pattern rules data may be in any addressable format. For example, in the second row of Table 2, below, the communication protocol and usage pattern rules data may provide a single critical KPI of minimizing power consumption when a low-power mode is detected at either the peripheral device node 373 or the information handling system node 330. As another example, in the third row of Table 2, the communication protocol and usage pattern rules data may list maximum range and minimal RSSI as KPIs that as critical requirements when the peripheral device node 373 is an external video monitor or external projector to which a mouse and a plurality of information handling systems, including node 330, may be operatively coupled, as in a conference room, and the peripheral device node 373 is displaying a PowerPoint® presentation. As yet another example, in the fourth row of Table 2, the communication protocol and usage pattern rules data may identify video resolution per watt of power consumed, latency, and throughput as critical KPIs when the peripheral device node 373 is an external video monitor or external projector to which a plurality of information handling systems, including 330 may be operatively coupled, as in a conference room, and a videoconferencing or screen-sharing application is not currently executing to display content to remote participants. Other embodiments contemplate any combination of one or more peripheral device operational telemetry readings with one or more critical KPIs given within Table 2, or other format of the communication protocol and usage pattern rules data.

TABLE 2

| Peripheral Device Operational Telemetry Reading(s) | Critical Key Performance Indicator(s) (KPIs) |
|---|---|
| Low-Power Mode | Power Consumption |
| Conference Room Projector or Video Display operatively coupled to mouse via communication protocol of interest PowerPoint ® Presentation Executing | 1. Maximum Range 2. Minimal RSSI |
| Peripheral device is external video display or projector operatively coupled to information handling system anchor node via communication protocol of interest Videoconferencing application executing but no remote participants, only local participants for security | Video Resolution per Watt - 50% Latency - 30% Throughput - 20% |

As described herein, the communication protocol and usage pattern rules data may provide a most critical KPI for a given peripheral device operational telemetry reading or combination of peripheral device operational telemetry readings, or may provide a plurality of critical KPIs for each of these scenarios. In some cases, a plurality of critical KPIs may be equally weighted, unless otherwise specified. For example, as shown in row two of Table 2, the communication protocol and usage pattern rules data may associate a most critical KPI of minimum power consumption with a peripheral device operational telemetry reading of low-power mode at the information handling system node 330 or the peripheral device node 373.

In other embodiments, the communication protocol and usage pattern rules data may rank a plurality of critical KPIs for a given peripheral device operational telemetry reading or combination of peripheral device operational telemetry readings. For example, the communication protocol and usage pattern rules data in an embodiment may rank the KPIs given within row three of Table 2 above according to importance in the situation described by the peripheral device operational telemetry readings also given in row three. More specifically, the communication protocol and usage pattern rules data may rank maximum range above minimal RSSI in criticality for the workload described by the peripheral device operational telemetry readings given within row three or Table 2.

In still other embodiments, the communication protocol and usage pattern rules data may weight each of a plurality of critical KPIs for a given peripheral device operational telemetry reading or combination of peripheral device operational telemetry readings. For example, the communication protocol and usage pattern rules data in an embodiment may assign a weight to each of the KPIs given within row four of Table 2 above according to importance in the situation described by the peripheral device operational telemetry readings also given in row four. More specifically, the communication protocol and usage pattern rules data may assign a weight of 50% to video resolution per watt of power consumed, a weight of 30% to latency, and a weight of 20% to throughput.

Code instructions for the peripheral device capability-aware communication protocol selection module 383 in an embodiment may execute at the one or more peripheral device workspace cloud orchestrator servers to identify the critical or ranked list of KPIs in the peripheral device protocol and capabilities table corresponding to one or more peripheral device operational telemetry readings from recently received peripheral device workspace anchor node status update documents. For example, upon receipt of the peripheral device workspace anchor node status update document in an embodiment at the peripheral device workspace cloud orchestrator 380, the peripheral device capability aware communication protocol selection module 383 may review the peripheral device operational telemetry readings therein to determine that the information handling system 330 or the peripheral device 370 has entered a low-power mode. In such an embodiment, the peripheral device capability aware communication protocol selection module 383 may access the communication protocol and usage pattern rules data in storage database 385 to determine that the single KPI of low power consumption is most critical, based on the determination that the information handling system node 330 or the peripheral device node 373 has entered a low-power mode.

In another example embodiment, upon receipt of the peripheral device workspace anchor node status update document at the peripheral device workspace cloud orchestrator 380, the peripheral device capability-aware communication protocol selection module 383 executed to determine from the peripheral device operational telemetry readings therein to determine that the peripheral device node 373 is an external video monitor or external projector to which a mouse and a plurality of information handling systems, including node 330 may be operatively coupled, as in a conference room, and the peripheral device node 373 is displaying a PowerPoint® presentation. In such an embodiment, execution of code instructions of the peripheral device capability-aware communication protocol selection module 383 may access the communication protocol and usage pattern rules table in storage 385 to determine that most critical KPIs, in ranked order, include maximum range and minimum RSSI, based on the received peripheral device operational telemetry readings.

In still another example embodiment, upon receipt of the peripheral device workspace anchor node status update document at the one or more peripheral device workspace cloud orchestrator servers executing the peripheral device capability aware communication protocol selection module 383 determine from the peripheral device operational telemetry readings therein to that the peripheral device node 373 is an external video monitor or external projector to which a plurality of information handling systems, including node 330 may be operatively coupled, as in a conference room, and a videoconferencing or screen-sharing application is not currently executing to display content to remote participants. In such an embodiment, the peripheral device capability aware communication protocol selection module 383 may access the communication protocol and usage pattern rules table in storage 385 to determine that most critical KPIs, as weighted are a weighted criticality of 50% for video resolution per watt of power consumed, a weighted criticality of 30% for latency, and a weighted criticality of 20% for throughput.

In an embodiment, code instructions for the peripheral device capability aware communication protocol selection module 383 may execute to determine a total performance capability value for each available communication protocol listed in the peripheral device protocol and capabilities table. For example, a single critical KPI of power consumption may be identified in an embodiment as the critical KPI using the communication protocol and usage pattern rules table, as described above. In such an embodiment, code instructions for the peripheral device capability aware communication protocol selection module 383 may execute to determine a total performance capability value for Wi-Fi of 2 Watts, for Bluetooth® of 1 Watt, and for USB of 0.5 Watts based on the peripheral device protocol and capabilities table, shown above at Table 1.

As another example, a critical KPI of range may be identified in an embodiment as most critical, with a second most critical KPI of RSSI using the communication protocol and usage pattern rules table, as described above. In such an embodiment, code instructions for the peripheral device capability aware communication protocol selection module 383 may execute to determine a range for Wi-Fi of 20 meters, for Bluetooth® of five meters, and for USB of 0.6 meters based on the peripheral device protocol and capabilities table, shown above at Table 1.

In other embodiments, the communication protocol and usage pattern rules data may define a minimum requirement for one or more ranked KPIs. For example, the communication protocol and usage pattern rules data in an embodiment may define, within the peripheral device protocol and capabilities table, a minimum requirement for the criticality ranked KPI of distance range of three meters. In such a case, code instructions for the peripheral device capability aware communication protocol selection module 383 may execute to assign the same selected capability value for range to Bluetooth® and to Wi-Fi, because both of these communication protocols meet the minimum requirement. When KPIs are ranked by the communication protocol and usage pattern rules data in an embodiment, the peripheral device capability aware communication protocol selection module 383 may execute to identify a communication protocol having a selected capability value for the highest ranked KPI first to meet critical requirements of performance for a software application executing on an anchor node 330 and with a peripheral device node 373 in the peripheral device workspace 370, and may only analyze selected capability values for lower ranking KPIs, when the selected capability values for two or more communication protocols are tied with respect to the first or highest ranked KPI. Thus, in the example embodiment described directly above, upon assigning the selected performance capability value for range to Bluetooth® and to Wi-Fi, because both of these communication protocols meet the minimum requirement, code instructions for the peripheral device capability aware communication protocol selection module 383 may execute to determine a total performance capability value for RSSI of −40 to Wi-Fi and of −10 to Bluetooth®.

In still other embodiments, the selected performance capabilities may be normalized for comparison with one another, prior to determination of the total performance capability values. In cases where the KPI is meant to be minimized, such as with latency for example, the KPIs may be normalized by dividing the difference between the specific KPI for a given communication protocol and the maximum possible value for that KPI by the range of possible KPIs given within the peripheral device protocol and capabilities table. For example, latency values may be normalized to provide a selected performance capability value of one for Wi-Fi (e.g., equivalent to (35−1)/(35−1)), a value of zero for Bluetooth® (e.g., equivalent to (35−35)/(35−1)), and a value of 0.12 for USB (e.g., equivalent to (5−35)/(35−1)).

In cases where the KPI is meant to be maximized, such as with range for example, the KPIs may be normalized by dividing the difference between the specific KPI for a given communication protocol and the minimum possible value for that KPI by the range of possible KPIs given within the peripheral device protocol and capabilities table. For example, range values may be normalized to provide a selected performance capability value of one for Wi-Fi (e.g., equivalent to (20−0.6)/(20−0.6)), a value of 0.227 for Bluetooth® (e.g., equivalent to (5−0.6)/(20−0.6)), and a value of zero for USB (e.g., equivalent to (0.6−0.6)/(20−0.6)) to meet critical operation requirements, such as, for software executing at the anchor information handling system node 330 and peripheral device node 373 in a peripheral device workspace. As another example, the RSSI values may be normalized to provide a selected performance capability value of zero for Wi-Fi (e.g., equivalent to (−40+40)/(−40+10)) and a selected performance capability value of one for Bluetooth® (e.g., equivalent to (−40+10)/(−40+10)). In still another example, throughput values may be normalized to provide a selected performance capability value of one for Wi-Fi (e.g., equivalent to (600−25)/(600−25)), a value of zero for Bluetooth® (e.g., equivalent to (25−25)/600−25)), and a value of 0.06 for USB (e.g., equivalent to (60−25)/(600−25)). In yet another example, video resolution per watt values may be normalized to provide a selected performance capability value of one for Wi-Fi (e.g., equivalent to (2−2)/(2−0.5)), a value of 0.67 for Bluetooth® (e.g., equivalent to (2−1)/(2−0.5)), and a value of zero for USB (e.g., equivalent to (0.5−0.5)/(2−0.5)).

As described herein, the communication protocol and usage pattern rules data in some embodiments my provide a weighting to a plurality of KPIs identified as critical within the communication protocol and usage pattern rules table (e.g., Table 2 above). For example, the communication protocol and usage pattern rules data in an embodiment may indicate a 50% criticality for a KPI of video resolution per watt of power consumed, a 30% criticality for latency, and a 20% criticality for throughput. In the case where the communication protocol and usage pattern rules data has provided such weighted values, normalized values for each of these KPIs may be determined prior to applying such weightings, as described directly above. Code instructions for the peripheral device capability aware communication protocol selection module 383 may then execute to determine a total weighted performance capability value for each communication protocol by applying these weights and summing their resulting values. For example, the Wi-Fi communication protocol may produce a weighted performance capability value of 0.5 for video resolution per watt (e.g., equivalent to 50% of the normalized value of one described directly above), a weighted performance capability value of 0.33 for latency (e.g., equivalent to 30% of the normalized value of one described directly above), and a weighted performance capability value of 0.2 for throughput (e.g., equivalent to 20% of the normalized value of one described directly above). These weighted performance capability values for Wi-Fi may then be summed to provide a total weighted performance capability value for Wi-Fi of 1.03.

In another example, the Bluetooth® communication protocol may produce a weighted performance capability value of 0.33 for video resolution per watt (e.g., equivalent to 50% of the normalized value of 0.67 described directly above), a weighted performance capability value of zero for latency (e.g., equivalent to 30% of the normalized value of zero described directly above), and a weighted performance capability value of zero for throughput (e.g., equivalent to 20% of the normalized value of zero described directly above). These weighted performance capability values for Bluetooth® may then be summed to provide a total weighted performance capability value for Bluetooth® of 0.33.

In yet another example, the USB communication protocol may produce a weighted performance capability value of zero for video resolution per watt (e.g., equivalent to 50% of the normalized value of zero described directly above), a weighted performance capability value of 0.04 for latency (e.g., equivalent to 30% of the normalized value of 0.12 described directly above), and a weighted performance capability value of zero for 0.012 (e.g., equivalent to 20% of the normalized value of 0.06 described directly above). These weighted performance capability values for Wi-Fi may then be summed to provide a total weighted performance capability value for Wi-Fi of 0.052.

Code instructions for the peripheral device capability-aware communication protocol selection module 383 may then execute on one or more peripheral device workspace cloud orchestrator servers to identify a communication protocol with the best total performance capability value among those determined in an embodiment. For example, in an embodiment in which the communication protocol and usage pattern rules data identifies a most critical KPI of minimum power consumption, USB may be identified as having a best total performance capability value of 0.5 watts (minimum available power consumption). As another example, in an embodiment in which the communication protocol and usage pattern rules data has ranked maximum range above minimal RSSI in criticality for the workload described by the peripheral device operational telemetry readings given within row three or Table 2, Wi-Fi may be identified as having a best total performance capability value of 20 meters, or a normalized best total performance capability value of one. As yet another example, in an embodiment in which the communication protocol and usage pattern rules data has ranked maximum range above minimal RSSI, with a minimum range requirement of 3 meters, Bluetooth® may be identified as having a best total performance capability value of −10 RSSI (e.g., because both Bluetooth® and Wi-Fi meet the minimum range requirement, only RSSI may be considered here as a tie-breaker), and having a best normalized total performance capability value of one. In still other embodiments, in which the communication protocol and usage pattern rules data has weighted each of a plurality of critical KPIs for a given peripheral device operational telemetry reading or combination of peripheral device operational telemetry readings, Wi-Fi may be identified as having a best total weighted and normalized performance capability value 1.03, in comparison to 0.33 for Bluetooth® and 0.052 for USB.

Code instructions for the peripheral device capability-aware communication protocol selection module in an embodiment may execute to instruct the anchor information handling system node 330 to operatively couple to the peripheral device node 371 according to the available communication protocol associated with the highest total weighted performance capability value as best-suited for meeting a critical performance level for the anchor node 330 operatively coupled with the peripheral device node 373 in the peripheral device workspace 370. Other factors, such as what communication protocol available for another peripheral device node other than peripheral device node 373 to operatively couple to the anchor information handling system 330 may be affected by which communication protocols are being used. For example, in an embodiment in which USB has been identified as having a best total performance capability value of 0.5 watts (minimum available power consumption), code instructions of the peripheral device capability aware communication protocol selection module 383 may execute to notify the workspace configuration recommendation service 382 of this determination. In such an embodiment, the execution of code instructions of the workspace configuration recommendation service 382 may instruct the ecosystem device management service 384 at the peripheral device workspace cloud orchestrator server to transmit an instruction to the ecosystem manageability sub-agent 390 at the anchor node 330 to configure the anchor information handling system node 330 and the peripheral device 370 to operatively couple to one another via a wired USB connection. If only one USB port is available on the anchor information handling system node 330, other peripheral device nodes in the peripheral device workspace 370 may be foreclosed from using available USB protocol for operative connectivity in some embodiments if function with the peripheral device node 373 is of higher critical level to the software application executing on the anchor information handling system node 330.

As another example, in an embodiment in which Wi-Fi has been identified as having a best total performance capability value, execution of code instructions of the peripheral device capability-aware communication protocol selection module 383 may notify the workspace configuration recommendation service 382 at the peripheral device workspace cloud orchestrator server of this determination. In such an embodiment, the workspace configuration recommendation service 382 may instruct the ecosystem device management service 384 to transmit an instruction to the ecosystem manageability sub-agent 390 at the anchor node 330 to configure the information handling system 330 and the peripheral device node 373 to operatively couple to one another via a wireless Wi-Fi connection. Other peripheral device nodes in the peripheral device workspace 370 may be limited or foreclosed from using available Wi-Fi protocol for operative connectivity in some embodiments if function with the peripheral device node 373 is of higher critical level to the software application executing on the anchor information handling system node 330 than for other peripheral device nodes to avoid congestion or interference of Wi-Fi wireless links as compared to another wireless or wired communication protocol.

In yet another example embodiment in which Bluetooth® has been identified as having a best total performance capability value, execution of code instructions for the peripheral device capability-aware communication protocol selection module 383 may notify the workspace configuration recommendation service 382 at the peripheral device workspace cloud orchestrator server of this determination. In such an embodiment, the workspace configuration recommendation service 382 may instruct the ecosystem device management service 384 to transmit an instruction to the ecosystem manageability sub-agent 390 at the anchor node 330 to configure the information handling system 330 and the peripheral device 370 to operatively couple to one another via a wireless Bluetooth® connection. Other peripheral device nodes in the peripheral device workspace 370 may be limited or foreclosed from using available Bluetooth® protocol for operative connectivity in some embodiments if function with the peripheral device node 373 is of higher critical level to the software application executing on the anchor information handling system node 330 than for other peripheral device nodes to avoid congestion or interference of Bluetooth® wireless links as compared to another wireless or wired communication protocol. In such a way, execution of code instructions for the peripheral device capability-aware communication protocol selection module and agent in embodiments may operate to determine availability of wired and wireless protocols for establishing communication links between peripheral devices within the new peripheral device workspace, determine capabilities of each of these peripheral devices according to each currently available communication protocol, and for each peripheral device, to identify, recommend, or automatically establish a link. The identification, recommendation, or automatically establishment of a communication link according to the communication protocol selected is based on the selected performance capabilities for that peripheral device node meeting critical operational requirements for a software application executing on an anchor information handling system node with the peripheral device node in a peripheral device workspace.

Figure 4:
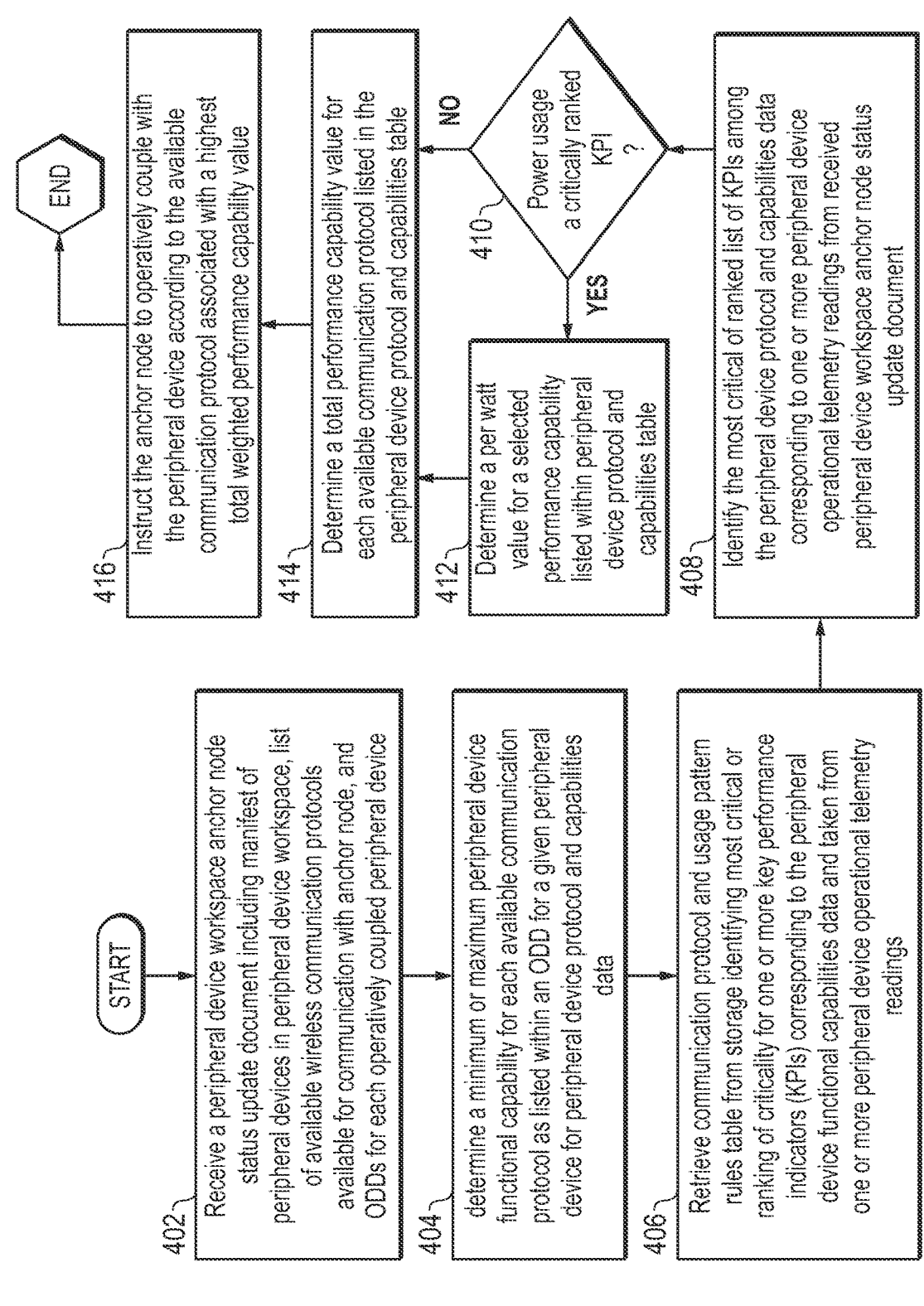
FIG. 4 is a flow diagram illustrating a method of automatically configuring a peripheral device node to operatively couple with an anchor information handling system node according to an available communication protocol best-suited for the user's current usage pattern according to an embodiment of the present disclosure.

FIG. 4 is a flow diagram illustrating a method of automatically configuring a peripheral device to operatively couple with an information handling system within a peripheral device workspace according to an available communication protocol within the peripheral device workspace that is best-suited for the user's current usage pattern at the information handling system according to an embodiment of the present disclosure. As described herein, when users shift from a first peripheral device workspace to a second peripheral device workspace, there is often a mismatch between the communication protocols available for operative coupling between a plurality of peripheral devices at these first and second peripheral device workspaces. As such, the choice of communication protocols for links among peripheral devices that is best suited for each of the peripheral devices' respective capabilities within the first peripheral device workspace may not match the best choice of communication protocols for those links within the second peripheral device workspace. Code instructions for the peripheral device capability-aware communication protocol selection module executing on a peripheral device workspace maintenance cloud server in embodiments herein may be executed each time a user joins a new peripheral device workspace to determine availability of wired and wireless protocols for establishing communication links between peripheral device nodes within the new peripheral device workspace, determine capabilities of each of these peripheral device nodes according to each currently available communication protocol, and for each peripheral device, to identify a link according to the communication protocol associated with selected capabilities for that peripheral device node to meet critical performance requirements of application software executing on the anchor node information handling system that has entered the new peripheral device workspace.

At block 402, a peripheral device workspace cloud orchestrator in an embodiment may receive a peripheral device workspace anchor node status update document including a manifest of peripheral devices in a peripheral device workspace, a list of available wireless communication protocols available for communication with the anchor node, and ODDs for each of the operatively coupled peripheral devices providing operational capabilities such as communication link capabilities for each node in the peripheral device workspace. For example, in an embodiment described above with respect to FIG. 2, execution of code instructions for an ecosystem manageability sub-agent 290 on a user information handling system 230 may monitor telemetry readings taken by a telemetry service 270 for peripheral device operational telemetry readings of a peripheral device workspace, such as time, location, applications currently executing or planned, connection types available (e.g., wireless, wired, wireless wide area network (WWAN), wireless local area network (WLAN), wireless private area network (WPAN)), capabilities or conditions for each connection type, security credentials for the user, or environmental sensor readings (e.g., humidity, temperature, ambient light), among other possible telemetry readings for the information handling system 230. These telemetry measurements may be gathered routinely, or upon each startup of an information handling system 230, for example in a peripheral device workspace such as 250 or 270.

Code instructions for the ecosystem manageability sub-agent 290 in an embodiment may execute on an anchor information handling system 230 to gather, via an ecosystem manageability interface 252 at one or more secondary node peripheral devices, such as 251, various peripheral device operational telemetry readings describing operational capabilities for the one or more secondary node peripheral devices within the peripheral device workspace 250. For example, the code instructions for the ecosystem manageability sub-agent 290 operating at the anchor node 230 may execute to gather peripheral device operational telemetry readings regarding the range of capabilities for each peripheral device (e.g., 251 and 254) including available connection protocol types and conditions or capabilities of each connection protocol type. The information defining the range of functional capabilities for the peripheral device 251 may be retrieved from the peripheral device 251 such as from within the firmware 253, or from an orchestration device descriptor (ODD) service 292 which may access a library of published ODD data for types of identified peripheral device nodes. In an embodiment, the ODD service 292 the peripheral device 251 may also retrieve and store static or non-adjustable features for the peripheral device 251, such as locations for various ports, physical dimensions of the new peripheral device 251, or physical locations for internal components such as an embedded camera. Model number, device number, media access control (MAC) address, or other identifying information for the peripheral device 251 may also be stored within the ODD service 292, or similar identifying information for the peripheral device 251 in an embodiment may be stored within firmware 253.

Each peripheral device 251 or 254 within a peripheral device workspace 250, or peripheral device 271 within a peripheral device workspace 270 may be associated with an orchestrated device descriptor (ODD) which includes a description of all non-configurable aspects of the peripheral device 251, 254, or 271, respectively, such as a list of communication protocols supported by the peripheral device 251, 254, or 271, respectively, minimum or maximum performance capabilities for each communication protocol, and average power consumption associated with links established according to each of those communication protocols. The minimum or maximum performance capabilities for each communication protocol listed within an ODD for a given device may be, for example, a relative signal strength indicator (RSSI), range, throughput, latency, dropped packets, or any other key performance indicator (KPI), including KPIs for other component performance, listed within performance specifications for that peripheral device 251, 254, or 271, respectively, as developed and distributed by the peripheral device manufacturer.

Each peripheral device, such as 251, 254, or 271 may include a range of capabilities, and the user may choose to configure the peripheral device 251, 254, or 271 to operate according to a selected setting or configuration within this range of capabilities. For example, these capabilities may include connectivity capabilities for a peripheral device 251, such as types of wired connectors or wireless protocols available configuration may include selection of connectivity type as well as speeds or bandwidths available. For example, each peripheral device, such as 251, 254, or 271 may include a range of available communication protocols according to which the peripheral device 251, 254, or 271 may establish a wired or wireless communication link to operatively couple with the anchor node 230. More specifically, peripheral devices 251, 254, or 271 in an example embodiment may be capable of establishing a wired communication link with the information handling system 230 according to a Universal Serial Bus (USB) communication protocol, such as USB 2.0, USB 3.0, or USB-C. In another example, peripheral devices 251, 254, or 271 in an example embodiment may be capable of establishing a wireless communication link with the information handling system 230 according to Wireless Local Area Network (WLAN) or Wireless Wide Area Network (WWAN) communication protocols, which may include Wi-Fi. In still other examples, peripheral devices 251, 254, or 271 in an example embodiment may be capable of establishing a wireless communication link with the information handling system 230 according to Wireless Private Area Network (WPAN) communication protocols, such as Bluetooth®, Bluetooth® Low Energy (BLE), or Wi-Fi Direct®.

The ecosystem manageability sub-agent 290 executing at the information handling system 230 may create a manifest listing each of the peripheral device nodes 251 and 254 within the peripheral device workspace 250, as well as the anchor node 230. When the anchor node 230 joins the second peripheral device workspace 270, the ecosystem manageability sub-agent 290 executing at the information handling system 230 may create a manifest listing the peripheral device node 271 within the peripheral device workspace 270, as well as the anchor node 230. The manifest of peripheral device nodes 251 and 254 and other nodes 230 as well as location of a peripheral device workspace 250 may be combined with the peripheral device operational telemetry readings for the peripheral device workspace 250 for capabilities and configuration settings and an identification of the anchor node information handling system 230 user into a peripheral device workspace anchor node status update document written in a machine-readable language or machine markup language such as JavaScript Object Notation (JSON), for example, for the peripheral device workspace. When the information handling system 230 joins the second peripheral device workspace 270, the manifest of peripheral device nodes 271 and other nodes 230 as well as location of a peripheral device workspace 270 may be combined with the peripheral device operational telemetry readings for the peripheral device workspace 270 for capabilities and configuration settings and an identification of the anchor node information handling system 230 user into a similarly formatted peripheral device workspace anchor node status update document. The peripheral device workspace anchor node status update document is transmitted for storage with the peripheral device workspace identification value at a peripheral device workspace management system database 285 operating in the peripheral device workspace cloud orchestrator 280. Each time a peripheral device configuration setting is changed by the user, a new peripheral device is added to the peripheral device workspace such as 250 or 270, the information handling system 230 moves from a first peripheral device workspace 250 to a second peripheral device workspace 270, or changes to peripheral device operational telemetry readings for the peripheral device workspace 250 or 270 are detected, a new peripheral device workspace 250 or 270 anchor node status update document including this updated configuration may be transmitted to the peripheral device workspace cloud orchestrator 280.

In another example embodiment described with respect to FIG. 3, when the user information handling system 330 transfers to the new peripheral device workspace 370 (from the first peripheral device workspace, such as 250 described with reference to FIG. 2), the user information handling system 330 or a smart peripheral device (not shown) acting as the anchor node for the new peripheral device workspace 370 may transmit an updated peripheral device workspace anchor node status update document. The updated peripheral device workspace anchor node status update document may be transmitted to the peripheral device workspace cloud orchestrator servers executing code instructions of an ecosystem device management service 384 for storage at the peripheral device workspace management system database 385. In an embodiment, the updated peripheral device workspace anchor node status update document may provide a user composite peripheral device workspace identifier for the user of the information handling system 330, a manifest of the information handling system 330 acting as the anchor node for the peripheral device workspace 370, a peripheral device workspace identification value for the peripheral device workspace 370, along with a location indicator and manifest of peripheral device nodes 373, as well as various other peripheral device operational telemetry readings, as described herein.

Code instructions for the peripheral device capability-aware communication protocol selection module in an embodiment at block 404 executing as part of the peripheral device workspace cloud orchestrator may execute at one or more peripheral device workspace cloud orchestrator servers to determine a minimum or maximum peripheral device functional capability for each available communication protocol as listed within an ODD to determine peripheral device protocol and capabilities data for a given peripheral device. The peripheral device protocol and capabilities data for a given peripheral device may thus be accessible to the code instructions for the peripheral device capability-aware communication protocol selection module in an embodiment executing as part of the peripheral device workspace cloud orchestrator for later determination of operative coupling communication protocol between the anchor information handling system node and a particular peripheral device node to meet critical functional requirements of one or more software applications executing at the anchor node information handling system in a peripheral device workspace.

In one example embodiment, the code instructions of the peripheral device capability-aware communication protocol selection module may execute to form and insert these values into a peripheral device protocol and capabilities table. For example, the communication protocol-dependent peripheral device functional capabilities listed within the peripheral device protocol and capabilities table, such as the example Table 1 above, may include, for example, a relative signal strength indicator (RSSI), range, throughput, latency, dropped packets, or any other key performance indicator (KPI) listed within performance specifications for that peripheral device node, as developed and distributed by the peripheral device manufacturer, and given within the ODD for the peripheral device node. As described herein, each peripheral device node, such as 373 within a peripheral device workspace 370 in FIG. 3 above, may be associated with an orchestrated device descriptor (ODD) which includes a description of all non-configurable aspects of the peripheral device node 373, such as a list of communication protocols supported by the peripheral device node 373, minimum or maximum performance capabilities for each communication protocol, and maximum power consumption for one or more possible peripheral device functional capabilities associated with links established according to each of those communication protocols. For example, the minimum or maximum performance capabilities for each communication protocol listed within an ODD for a given device may include, for example, a relative signal strength indicator (RSSI), range, throughput, latency, dropped packets, or any other key performance indicator (KPI) listed within performance specifications for that device, as developed and distributed by the peripheral device manufacturer.

The ODD for the peripheral device node in an embodiment may describe a minimum achievable RSSI of −40 when operatively coupled via a Wi-Fi wireless communication link, a maximum achievable range of 20 meters when operatively coupled via a Wi-Fi wireless communication link, and an average of two watts consumed to transmit at a 4K UHD video resolution. In another example, the ODD for the peripheral device node in an embodiment may describe a minimum achievable RSSI of −10 when operatively coupled via a Bluetooth® wireless communication link, a maximum achievable range of 5 meters when operatively coupled via a Bluetooth® wireless communication link, and an average of one watt consumed to transmit at a 2K UHD video resolution. In still another example, the ODD for the peripheral device node in an embodiment may describe a maximum achievable range of 0.6 meters when operatively coupled via a USB wired communication link, and an average of 0.5 watts to transmit at a 720×1280 pixel (720p) standard resolution.

The peripheral device protocol and capabilities data for the peripheral device node or nodes, which may be in a table format in some example embodiments, may thus indicate for each of the peripheral device nodes, such as 373 in FIG. 3, within the peripheral device workspace 370, capabilities for each available communication protocol within the current peripheral device workspace 370. In a specific example, Table 1 above may include KPIs such as minimum achievable RSSI and maximum achievable range for each of the available communication protocols within which the external video display peripheral device is capable of establishing links. In addition, Table 1 may include a column furthest to the right indicating that receiving video at a 4K UHD video resolution, which may be the highest resolution achievable using the Wi-Fi communication protocol may consume two watts of power. The column furthest to the right may also indicate that receiving video at the 2K HD video resolution, which may be the highest resolution achievable using the Bluetooth® communication protocol may consume one watt of power. The column furthest to the right may also indicate that receiving video at the 720×1080 (720p) standard video resolution, which may be the highest resolution achievable using the USB communication protocol may consume one half watt of power. It is understood that the table is used for explanatory purposes and the code instructions for the peripheral device capability-aware communication protocol selection module executing as part of the peripheral device workspace cloud orchestrator 380 may access the peripheral device protocol and capabilities data for a peripheral device node 373 in any addressable format.

At block 406, code instructions for the peripheral device capability aware communication protocol selection module in an embodiment may execute to retrieve a communication protocol and usage pattern rules, also in a table format in some example embodiments, from a storage database. The communication protocol and usage pattern rules may be used to identify a most critical or a ranking of criticality for one or more key performance indicators (KPIs) corresponding to the peripheral device functional capabilities from the peripheral device protocol and capabilities data. The communication protocol and usage pattern rules selected based on one or more peripheral device operational telemetry readings for environmental telemetry data from a peripheral device workspace. These one or more peripheral device operational telemetry readings with the communication protocol and usage pattern rules determine critical functional requirements of one or more software applications executing at the anchor information handling system node with a peripheral device node in a peripheral device workspace according to embodiments herein. As described herein, the communication protocol and usage pattern rules referencing relevant one or more peripheral device operational telemetry readings in the peripheral device workspace may be utilized in any format and, in one example embodiment, may be formed into a table as discussed some embodiments herein (e.g., Table 2).

For example, in an embodiment described with reference to FIG. 1, an information technology decision maker (ITDM) for an enterprise may, in parts, provide some of such a communication protocol and usage pattern rules data, for example in a table (e.g., Table 2 above), to the peripheral device workspace cloud orchestrator 156 as operational policy for an enterprise via the console 160 graphical user interface in one embodiment. In another example embodiment described with reference to FIG. 3, code instructions for the peripheral device capability aware communication protocol selection module 383 may execute to retrieve a communication protocol and usage pattern rules data, such as in a table format in one embodiment, from storage 385 for identifying a most critical or a ranking of criticality for one or more key performance indicators (KPIs) corresponding to the peripheral device functional capabilities listed within the peripheral device protocol and capabilities data from the one or more peripheral device operational telemetry readings (e.g., Table 1 above), based on one or more peripheral device operational telemetry readings for the peripheral device node 373 or the information handling system 330. Factors from the one or more peripheral device operational telemetry readings in the peripheral device workspace may include detecting software applications executing on the anchor node information handling system and data or performance requirements for those software applications, peripheral device nodes needed or to be operatively coupled for the executing software applications, other peripheral device nodes in the peripheral device workspace and communication protocols used or available for those other operative couplings to the anchor information handling system, power levels for peripheral device nodes, radio link or cable conditions for connectivity in the peripheral device workspace, and other factors.

The execution of code instructions of the peripheral device capability-aware communicate protocol selection module in an embodiment may associate one or more peripheral device operational telemetry readings, which may include telemetry readings for the information handling system 330 or the peripheral device node 373 in embodiments such as described with respect to FIG. 3, with one or more critical KPIs that are impacted in the communication protocol and usage pattern rules data. This may done, for example, in order to define a highest priority or ranked or weighted list of priorities for peripheral device functional capabilities based on a detected usage pattern or current workload, as reflected in the received peripheral device operational telemetry readings for the software applications executing on an anchor information handling system and the peripheral device nodes in a peripheral device workspace that are needed for those software applications among other factors, such as power and wireless or wired link conditions within the peripheral device workspace.

For example as described with respect to FIG. 3, the communication protocol and usage pattern rules data may be used during execution of code instructions for the peripheral device capability-aware communication protocol selection module 383 at the peripheral device workspace cloud orchestrator servers to identify, rank, or weigh various KPIs that are most critical during execution of a specific software application at the anchor information handling system node 330 with which the peripheral device node 373 may communicate via one or more available communication protocols. More specifically execution of code instructions for the peripheral device capability-aware communication protocol selection module 383 may determine from operational telemetry readings that the second row of Table 2, above, applies from the communication protocol and usage pattern rules data. Thus, execution of code instructions for the peripheral device capability-aware communication protocol selection module 383 may determine that a most critical KPI of minimizing power consumption when a low-power mode is detected at either the peripheral device node 373 or the information handling system 330. As another example, execution of code instructions for the peripheral device capability-aware communication protocol selection module 383 may determine from operational telemetry readings that the third row of Table 2, above, applies from the communication protocol and usage pattern rules data. Thus, execution of code instructions for the peripheral device capability-aware communication protocol selection module 383 determines from the third row of Table 2 that the communication protocol and usage pattern rules data may list maximum range and minimal RSSI as KPIs that are critical when the peripheral device node 373 is an external video monitor or external projector to which a mouse and a plurality of information handling systems, including 330 may be operatively coupled, as in a conference room, and the peripheral device node 373 is displaying a PowerPoint® presentation. As yet another example, execution of code instructions for the peripheral device capability-aware communication protocol selection module 383 may determine from operational telemetry readings that the fourth row of Table 2, above, applies from the communication protocol and usage pattern rules data. Thus, execution of code instructions for the peripheral device capability-aware communication protocol selection module 383 determines from the fourth row of Table 2, the communication protocol and usage pattern rules data may identify video resolution per watt of power consumed, latency, and throughput as critical KPIs when the peripheral device node 373 is an external video monitor or external projector to which a plurality of information handling systems, including 330 may be operatively coupled, as in a conference room, and a videoconferencing or screen-sharing application is not currently executing to display content to remote participants.

As described herein, execution of code instructions of the peripheral device capability-aware communication protocol selection module at the peripheral device workspace cloud orchestrator servers using the communication protocol and usage pattern rules data may determine a most critical KPI, a ranked list of KPIs, or a weighted list of KPIs for a given peripheral device operational telemetry reading or combination of peripheral device operational telemetry readings, or may provide a plurality of critical KPIs for each of these scenarios. In some cases, a plurality of critical KPIs may be equally weighted, unless otherwise specified by the communication protocol and usage pattern rules data. For example, as shown in row two of Table 2, the execution of code instructions for the peripheral device capability-aware communication protocol selection module 383 associates a most critical KPI of minimum power consumption with a peripheral device operational telemetry reading of low-power mode at the information handling system 330 or the peripheral device node 373. As another example, the execution of code instructions for the peripheral device capability-aware communication protocol selection module 383 in an embodiment ranks the KPIs given within row three of Table 2 above according to importance in the situation described by the peripheral device operational telemetry readings also given in row three. More specifically, the execution of code instructions for the peripheral device capability-aware communication protocol selection module 383 ranks maximum range above minimal RSSI in criticality for the workload described by the peripheral device operational telemetry readings given within row three or Table 2 in an example embodiment. In yet another example, the execution of code instructions for the peripheral device capability-aware communication protocol selection module 383 in an embodiment assigns a weight to each of the KPIs given within row four of Table 2 above according to importance in the situation described by the peripheral device operational telemetry readings also given in row four. More specifically, the execution of code instructions for the peripheral device capability-aware communication protocol selection module 383 assigns a weight of 50% to video resolution per watt of power consumed, a weight of 30% to latency, and a weight of 20% to throughput for the execution of a videoconferencing application under the peripheral device workspace conditions detected.

In an embodiment at block 408, code instructions for the peripheral device capability aware communication protocol selection module in an embodiment may execute to identify the most critical or ranked list of KPIs in the peripheral device protocol and capabilities data corresponding to one or more peripheral device operational telemetry readings from a recently received peripheral device workspace anchor node status update document. For example, upon receipt of the peripheral device workspace anchor node status update document in an embodiment with reference to FIG. 3 at the peripheral device workspace cloud orchestrator 380, execution of code instructions for the peripheral device capability-aware communication protocol selection module 383 at the peripheral device workspace cloud orchestrator servers may determine from the peripheral device operational telemetry readings therein that the information handling system 330 or the peripheral device 370 has entered a low-power mode. In such an embodiment, the peripheral device capability aware communication protocol selection module 383 may access the communication protocol and usage pattern rules data, such as in a table format, in storage database 385 to determine that the single KPI of low power consumption is most critical, based on the determination that the information handling system 330 or the peripheral device 370 has entered a low-power mode from recent environmental telemetry data readings from the peripheral device workspace 370.

In another example embodiment, upon receipt of the peripheral device workspace anchor node status update document at the peripheral device workspace cloud orchestrator 380, execution of code instructions for the peripheral device capability aware communication protocol selection module 383 may determine from the peripheral device operational telemetry readings therein that the peripheral device node 373 is an external video monitor or external projector to which a mouse and a plurality of information handling systems, including 330, may be operatively coupled, as in a conference room, and the peripheral device node 373 is displaying a PowerPoint® presentation. In such an embodiment, execution of code instructions for the peripheral device capability-aware communication protocol selection module 383 at the peripheral device workspace cloud orchestrator servers may access the communication protocol and usage pattern rules table in storage database 385 to determine that most critical KPIs, in ranked order, include maximum range and minimum RSSI, based on the received peripheral device operational telemetry readings.

In still another example embodiment, upon receipt of the peripheral device workspace anchor node status update document at the peripheral device workspace cloud orchestrator 380, execution of code instructions for the peripheral device capability-aware communication protocol selection module 383 may determine from the peripheral device operational telemetry readings therein that the peripheral device node 373 is an external video monitor or external projector to which a plurality of information handling systems, including 330 may be operatively coupled, as in a conference room, and a videoconferencing or screen-sharing application is currently executing to display content to local participants via Wi-Fi Direct but limited to not currently execute to display content to remote participants (e.g., via Wi-Fi or another externally available connectivity protocol) due to security. In such an embodiment, the peripheral device capability aware communication protocol selection module 383 may access the communication protocol and usage pattern rules table in storage 385 to determine that most critical KPIs, as weighted are a weighted criticality of 50% for video resolution per watt of power consumed, a weighted criticality of 30% for latency, and a weighted criticality of 20% for throughput to support use of Wi-Fi Direct or other locally-limited connectivity protocols over other connectivity protocols.

At block 410 in an embodiment, execution of code instructions for the peripheral device capability-aware communication protocol selection module at the peripheral device workspace cloud orchestrator servers may determine whether power usage is a highest ranked or most critical KPI, as determined at block 408. For example, execution of code instructions for the peripheral device capability-aware communication protocol selection module at the peripheral device workspace cloud orchestrator servers may determine that low power consumption is a highest priority for a peripheral device with low current battery levels, or a peripheral device or anchor node operating in low-power status. If power usage is a highest ranked or most critical KPI in an embodiment, this may indicate that power consumed during communication via any available communication protocol should be considered priority when choosing the best-suited communication protocol, and the method may proceed to block 412 to adjust the peripheral device protocol and capabilities data, such as in a table embodiment, to account for per watt usage. If the power usage is not a highest ranked or most critical KPI in an embodiment, this may indicate that available communication protocols that consume a relatively higher amount of power may still be best-suited for the current usage pattern, and such an adjustment may not be necessary. In such a case, the method may proceed directly to block 414 for execution of code instructions for the peripheral device capability-aware communication protocol selection module at the peripheral device workspace cloud orchestrator servers to identify with the peripheral device protocol and capabilities table of a communication protocol associated with a best total weighted performance capability value.

In an embodiment at block 412 in which execution of code instructions for the peripheral device capability-aware communication protocol selection module at the peripheral device workspace cloud orchestrator servers determines power usage is a highest ranked or most critical KPI, code instructions for the peripheral device capability-aware communication protocol selection module may execute to determine a per watt value for one or more selected performance capabilities listed within peripheral device protocol and capabilities table. For example, in an embodiment described with reference to FIG. 3, each peripheral device, such as 371 within a peripheral device workspace 370 may be associated with an orchestrated device descriptor (ODD) which includes a description of all non-configurable aspects of the peripheral device node 373, including maximum power consumption for one or more selected peripheral device functional capabilities associated with links established according to each of those communication protocols. A selected peripheral device functional capability in this context may describe a highest possible functional capability where a maximum is most desirable, such as a video resolution, refresh rate, color gamut, video capture frames per second, image depth, or response time for an external display peripheral device or for an external webcam. Another example of a selected peripheral device functional capability in this context may describe a maximum achievable polling rate or sensitivity level for a mouse, touchpad, touchscreen, or keyboard peripheral device. Still another example of a selected peripheral device functional capability in this context may describe a minimum keystroke or button detection response time for a mouse, touchpad, touchscreen, or keyboard peripheral device. Yet another example of a selected peripheral device functional capability may describe turning on one or more audio or video filters such as noise reduction or application of a background in a video image. As described herein, each ODD for each peripheral device such as 371 may include power consumption per watt for each of these selected functional capabilities.

At block 414, code instructions for the peripheral device capability-aware communication protocol selection module may execute at the peripheral device workspace cloud orchestrator server to determine a total performance capability value for each available communication protocol listed in the peripheral device protocol and capabilities data, such as one example of an embodiment peripheral device protocol and capabilities data table. In an embodiment, code instructions for the peripheral device capability-aware communication protocol selection module 383 may execute to determine a total performance capability value for each available communication protocol listed in the peripheral device protocol and capabilities table. For example, a critical KPI of power consumption may be identified in an embodiment as the most critical KPI from the code instructions for the peripheral device capability-aware communication protocol selection module may execute at the peripheral device workspace cloud orchestrator server using the peripheral device workspace environmental telemetry readings and accessing the communication protocol and usage pattern rules data. In such an embodiment, code instructions for the peripheral device capability-aware communication protocol selection module 383 may execute to determine a total performance capability value for Wi-Fi of 2 Watts, for Bluetooth® of 1 Watt, and for USB of 0.5 Watts based on the peripheral device protocol and capabilities table, shown above at Table 1, in one example embodiment.

As another example, code instructions for the peripheral device capability-aware communication protocol selection module may execute at the peripheral device workspace cloud orchestrator server may determine a critical KPI of range may be identified in an embodiment as most critical, with a second most critical KPI of RSSI using the communication protocol and usage pattern rules table, as described above. In such an embodiment, code instructions for the peripheral device capability-aware communication protocol selection module 383 may execute to determine a range for Wi-Fi of 20 meters, for Bluetooth® of five meters, and for USB of 0.6 meters based on the peripheral device protocol and capabilities table, shown above at Table 1, in another example embodiment.

In other embodiments, the communication protocol and usage pattern rules data may define a minimum requirement for one or more ranked KPIs. For example, the communication protocol and usage pattern rules data in an embodiment may define a minimum requirement for the highest criticality ranked KPI of range of three meters. In such a case, code instructions for the peripheral device capability aware communication protocol selection module 383 may execute to assign the same selected performance capability value for range to Bluetooth® and to Wi-Fi, because both of these communication protocols meet the minimum requirement. When code instructions for the peripheral device capability-aware communication protocol selection module may execute at the peripheral device workspace cloud orchestrator server determines that KPIs are ranked by the communication protocol and usage pattern rules data in an embodiment based on the received peripheral device workspace environmental telemetry data, the peripheral device capability aware communication protocol selection module 383 may execute to identify a communication protocol having a selected performance capability value for the highest ranked KPI first, and may only analyze selected performance capability values for lower ranking KPIs, when the selected performance capability values for two or more communication protocols are tied with respect to the first or highest ranked KPI. Thus, in the example embodiment described directly above, upon assigning the same selected performance capability value for range to Bluetooth® and to Wi-Fi, because both of these communication protocols meet the minimum requirement, code instructions for the peripheral device capability-aware communication protocol selection module 383 may execute to determine a total performance capability value for RSSI of −40 to Wi-Fi and of −10 to Bluetooth®.

In still other embodiments, the selected performance capabilities may be normalized for comparison with one another, prior to determination of the total performance capability values. In cases where the KPI is meant to be minimized, such as with latency for example, the KPIs may be normalized by dividing the difference between the specific KPI for a given communication protocol and the maximum possible value for that KPI by the range of possible KPIs given within the peripheral device protocol and capabilities table. For example, latency values may be normalized to provide a selected performance capability value of one for Wi-Fi (e.g., equivalent to (35−1)/(35−1)), a value of zero for Bluetooth® (e.g., equivalent to (35−35)/(35−1)), and a value of 0.12 for USB (e.g., equivalent to (5−35)/(35−1)).

In cases where the KPI is meant to be maximized, such as with range for example, the KPIs may be normalized by dividing the difference between the specific KPI for a given communication protocol and the minimum possible value for that KPI by the range of possible KPIs given within the peripheral device protocol and capabilities table. For example, range values may be normalized to provide a selected performance capability value of one for Wi-Fi (e.g., equivalent to (20−0.6)/(20−0.6)), a value of 0.227 for Bluetooth® (e.g., equivalent to (5−0.6)/(20−0.6)), and a value of zero for USB (e.g., equivalent to (0.6−0.6)/(20−0.6)). As another example, the RSSI values may be normalized to provide a selected performance capability value of zero for Wi-Fi (e.g., equivalent to (−40+40)/(−40+10)) and a selected performance capability value of one for Bluetooth® (e.g., equivalent to (−40+10)/(−40+10)). In still another example, throughput values may be normalized to provide a selected performance capability value of one for Wi-Fi (e.g., equivalent to (600−25)/(600−25)), a value of zero for Bluetooth® (e.g., equivalent to (25−25)/600−25)), and a value of 0.06 for USB (e.g., equivalent to (60−25)/(600−25)). In yet another example, video resolution per watt values may be normalized to provide a selected performance capability value of one for Wi-Fi (e.g., equivalent to (2−2)/(2−0.5)), a value of 0.67 for Bluetooth® (e.g., equivalent to (2−1)/(2−0.5)), and a value of zero for USB (e.g., equivalent to (0.5−0.5)/(2−0.5)).

As described herein, the communication protocol and usage pattern rules data in some embodiments may provide a weighting to a plurality of KPIs identified as critical within the communication protocol and usage pattern rules table (e.g., Table 2 above). For example, the communication protocol and usage pattern rules data in an embodiment may indicate a 50% criticality for a KPI of video resolution per watt of power consumed, a 30% criticality for latency, and a 20% criticality for throughput. In the case where the communication protocol and usage pattern rules data has provided such weighted values, normalized values for each of these KPIs may be determined prior to applying such weightings, as described directly above. Code instructions for the peripheral device capability aware communication protocol selection module 383 may then execute to determine a total weighted performance capability value for each communication protocol by applying these weights and summing their resulting values. For example, the Wi-Fi communication protocol may produce a weighted performance capability value of 0.5 for video resolution per watt (e.g., equivalent to 50% of the normalized value of one described directly above), a weighted performance capability value of 0.33 for latency (e.g., equivalent to 30% of the normalized value of one described directly above), and a weighted performance capability value of 0.2 for throughput (e.g., equivalent to 20% of the normalized value of one described directly above). These weighted performance capability values for Wi-Fi may then be summed to provide a total weighted performance capability value for Wi-Fi of 1.03.

In another example, the Bluetooth® communication protocol may produce a weighted performance capability value of 0.33 for video resolution per watt (e.g., equivalent to 50% of the normalized value of 0.67 described directly above), a weighted performance capability value of zero for latency (e.g., equivalent to 30% of the normalized value of zero described directly above), and a weighted performance capability value of zero for throughput (e.g., equivalent to 20% of the normalized value of zero described directly above). These weighted performance capability values for Bluetooth® may then be summed to provide a total weighted performance capability value for Bluetooth® of 0.33.

In yet another example, the USB communication protocol may produce a weighted performance capability value of zero for video resolution per watt (e.g., equivalent to 50% of the normalized value of zero described directly above), a weighted performance capability value of 0.04 for latency (e.g., equivalent to 30% of the normalized value of 0.12 described directly above), and a weighted performance capability value of zero for 0.012 (e.g., equivalent to 20% of the normalized value of 0.06 described directly above). These weighted performance capability values for Wi-Fi may then be summed to provide a total weighted performance capability value for Wi-Fi of 0.052.

Code instructions for the peripheral device capability-aware communication protocol selection module 383 may then execute to identify a communication protocol with the best total performance capability value in an embodiment. For example, in an embodiment in which the communication protocol and usage pattern rules data identifies a most critical KPI of minimum power consumption, USB may be identified as having a best total performance capability value of 0.5 watts (minimum available power consumption). As another example, in an embodiment in which the communication protocol and usage pattern rules data has ranked maximum range above minimal RSSI in criticality for the workload described by the peripheral device operational telemetry readings given within row three or Table 2, Wi-Fi may be identified as having a best total performance capability value of 20 meters, or a normalized best total performance capability value of one. As yet another example, in an embodiment in which the communication protocol and usage pattern rules data has ranked maximum range above minimal RSSI, with a minimum range requirement of 3 meters, Bluetooth® may be identified as having a best total performance capability value of −10 RSSI (e.g., because both Bluetooth® and Wi-Fi meet the minimum range requirement, only RSSI may be considered here as a tie-breaker), and having a best normalized total performance capability value of one. In still other embodiments, in which the communication protocol and usage pattern rules data has weighted each of a plurality of critical KPIs for a given peripheral device operational telemetry reading or combination of peripheral device operational telemetry readings, Wi-Fi may be identified as having a best total weighted and normalized performance capability value 1.03, in comparison to 0.33 for Bluetooth® and 0.052 for USB.

Code instructions for the peripheral device capability aware communication protocol selection module in an embodiment at block 416 may execute at a peripheral device workspace cloud orchestrator server to instruct the anchor node to operatively couple to the peripheral device according to the available communication protocol associated with the highest total weighted performance capability value as best-suited for performance of the peripheral device meeting a critical operational requirement of the software application executing on the information handling system or other critical operational requirement in place due to environmental context telemetry readings from the peripheral device workspace (e.g., power levels or wired or wireless communication link conditions). For example, in an embodiment in which USB has been identified as having a best total performance capability value of 0.5 watts (minimum available power consumption), execution of code instructions for the peripheral device capability aware communication protocol selection module 383 may notify the workspace configuration recommendation service 382 of this determination. In such an embodiment, the execution of code instructions of the workspace configuration recommendation service 382 at the peripheral device workspace cloud orchestrator server may instruct the ecosystem device management service 384 to transmit an instruction to the ecosystem manageability sub-agent 390 at the anchor node 330 to configure the information handling system 330 and the peripheral device 370 to operatively couple to one another via a wired USB connection. As another example, in an embodiment in which Wi-Fi has been identified as having a best total performance capability value, execution of code instructions of the peripheral device capability aware communication protocol selection module 383 may notify the workspace configuration recommendation service 382 of this determination. In such an embodiment, execution of code instructions of the workspace configuration recommendation service 382 may instruct the ecosystem device management service 384 to transmit an instruction to the ecosystem manageability sub-agent 390 at the anchor node 330 to configure the information handling system 330 and the peripheral device 370 to operatively couple to one another via a wireless Wi-Fi connection. In yet another example embodiment in which Bluetooth® has been identified as having a best total performance capability value, execution of code instructions of the peripheral device capability aware communication protocol selection module 383 may notify the workspace configuration recommendation service 382 of this determination. In such an embodiment, execution of code instructions of the workspace configuration recommendation service 382 may instruct the ecosystem device management service 384 to transmit an instruction to the ecosystem manageability sub-agent 390 at the anchor node 330 to configure the information handling system 330 and the peripheral device 370 to operatively couple to one another via a wireless Bluetooth® connection.

In an embodiment described with respect to FIG. 1, for example, one or more peripheral device workspace cloud orchestrator servers 158 may propagate peripheral device operational configuration policies down to node devices within a peripheral device workspace such as the information handling system 100, a docking station 151, video display device 144, keyboard 146, stylus 148, microphone 153, camera 154, speaker 155, trackpad 150, mouse 152, and the like. Such peripheral device operational configuration policies may be adjusted by the peripheral device capability aware communication protocol selection module 169 to include the instruction to operatively couple the information handling system 100 to the peripheral device (e.g., 142) via the communication protocol identified, as described directly above, having the best total performance capability value. In such a way, execution of code instructions for the peripheral device capability-aware communication protocol selection module in embodiments may operate to determine availability of wired and wireless protocols for establishing communication links between peripheral devices within the new peripheral device workspace, determine capabilities of each of these peripheral devices according to each currently available communication protocol, and for each peripheral device, to identify, recommend, or automatically establish a link according to the communication protocol associated with best capabilities for that peripheral device. The method for automatically configuring a peripheral device to operatively couple with an information handling system within a peripheral device workspace according to an available communication protocol within the peripheral device workspace that is best-suited for the user's current usage pattern may then end.

The blocks of the flow diagram of FIG. 4 or steps and aspects of the operation of the embodiments herein and discussed herein need not be performed in any given or specified order. It is contemplated that additional blocks, steps, or functions may be added, some blocks, steps or functions may not be performed, blocks, steps, or functions may occur contemporaneously, and blocks, steps or functions from one flow diagram may be performed within another flow diagram.

Devices, modules, resources, or programs that are in communication with one another need not be in continuous communication with each other, unless expressly specified otherwise. In addition, devices, modules, resources, or programs that are in communication with one another may communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The subject matter described herein is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents and shall not be restricted or limited by the foregoing detailed description.

What is claimed is:

1. A peripheral device workspace cloud orchestrator executing at a cloud-based information handling system comprising:

a network interface device to receive a plurality of peripheral device operational telemetry readings describing a current usage pattern for an anchor information handling system node and a plurality of available communication protocols with a peripheral device node at an identified location for communication between the anchor information handling system node and the peripheral device node;

a hardware processor executing code instructions for a peripheral device capability-aware communication protocol selection module to generate a plurality of communication protocol-dependent peripheral device functional capabilities for the peripheral device node within a manifest of one or more peripheral device nodes that are operatively coupled to the anchor information handling system node at the identified location to form a defined peripheral device workspace identified by a peripheral device workspace identification value;

hardware processor executing code instructions for a peripheral device capability-aware communication protocol selection module to determine from the plurality of peripheral device operational telemetry readings describing the current usage pattern for the anchor information handling system node a critical operational requirement of the anchor information handling system node or the peripheral device node and to select a selected communication protocol for meeting the critical operational requirement of the anchor information handling system node or the peripheral device node; and the hardware processor to execute code instructions for the peripheral device workspace cloud orchestrator to instruct the anchor information handling system node to operatively couple to the peripheral device node using the selected communication protocol.

2. The peripheral device workspace cloud orchestrator executing at a cloud-based information handling system of claim 1, wherein the selected communication protocol is Wi-Fi having at least one key performance indicator (KPI) capable of providing wireless connectivity for meeting the critical operational requirement of the anchor information handling system node or a peripheral device node in the peripheral device workspace.

3. The peripheral device workspace cloud orchestrator executing at a cloud-based information handling system of claim 1, wherein at least one of the received plurality of peripheral device operational telemetry readings associated with meeting the critical operational requirement of the anchor information handling system node or the peripheral device node is a specifically identified type of software application executing at the anchor information handling system node in the peripheral device workspace.

4. The peripheral device workspace cloud orchestrator executing at a cloud-based information handling system of claim 1, wherein the selected communication protocol is a Universal Serial Bus (USB) standard for wired communication having at least one key performance indicator (KPI) capable of providing wireless connectivity for meeting the critical operational requirement of the anchor information handling system node or a peripheral device node in the peripheral device workspace.

5. The peripheral device workspace cloud orchestrator executing at a cloud-based information handling system of claim 1 further comprising:

the hardware processor to execute code instructions to identify a most critical key performance indicator (KPI) for best operation of the peripheral device node in operable coupling with the anchor information handling system node that is associated with at least one of the received plurality of peripheral device operational telemetry readings; and the hardware processor to execute code instructions to select the selected communication protocol having a best measured telemetry value for one of the plurality of communication protocol-dependent peripheral device functional capabilities corresponding to meet the most critical KPI for the peripheral device node.

6. The peripheral device workspace cloud orchestrator executing at a cloud-based information handling system of claim 1 further comprising;

the hardware processor to execute code instructions to identify two most critical key performance indicators (KPIs) for best operation of the peripheral device node in operable coupling with the anchor information handling system node that includes power conservation as a first critical KPI and a second critical KPI that are each associated with at least one of the received plurality of peripheral device operational telemetry readings; and the hardware processor to execute code instructions to select the selected communication protocol having a best value per watt of power consumed for one of the plurality of communication protocol-dependent peripheral device functional capabilities corresponding to the second critical KPI for the peripheral device node.

7. The peripheral device workspace cloud orchestrator executing at a cloud-based information handling system of claim 1 further comprising:

the hardware processor to execute code instructions to identify a ranked list of critical key performance indicators (KPIs) for best operation of the peripheral device that that are each associated with at least one of the received plurality of peripheral device operational telemetry readings; and the hardware processor to execute code instructions to select one of the plurality of available communication protocols having a best value, weighted by a rank within the ranked list of critical KPIs, for one of the plurality of communication protocol-dependent peripheral device functional capabilities corresponding to each of the ranked list of critical KPIs for the peripheral device as a best-suited communication protocol.

8. A method executing code instructions for a peripheral device capability-aware communication protocol selection module to select a best performing wireless communication protocol for operative coupling of a peripheral device node and an anchor information handling system node comprising:

receiving, via a network interface device, a plurality of peripheral device operational telemetry readings describing a current usage pattern for the anchor information handling system node and a plurality of available wireless communication protocols with the peripheral device node at an identified location for wireless communication between the anchor information handling system node and the peripheral device node;

determining, via execution of code instructions by a hardware processor at a peripheral device workspace cloud orchestrator server, a plurality of wireless communication protocol-dependent peripheral device functional capabilities for the peripheral device node within a manifest of one or more peripheral device nodes that are operatively coupled to the anchor information handling system at the identified location to form a defined peripheral device workspace identified by a peripheral device workspace identification value;

identifying, via execution of code instructions by the hardware processor, at least one critical key performance indicators (KPIs) for meeting a critical operational requirement of the anchor information handling system node or the peripheral device node that is associated with at least one of the received plurality of peripheral device operational telemetry readings;

executing code instructions, via the hardware processor, for a peripheral device capability-aware communication protocol selection module to select a selected communication protocol for meeting the critical operational requirement of the anchor information handling system node or the peripheral device node based on the plurality of peripheral device operational telemetry readings describing the current usage pattern for the anchor information handling system node in the peripheral device workspace; and instructing the anchor information handling system node, via execution of code instructions by a hardware processor, to operatively couple to the peripheral device node using the selected communication protocol meeting the critical operational requirement of the anchor information handling system node or the peripheral device node and corresponding to the critical KPI.

9. The method of claim 8, wherein the plurality of wireless communication protocol-dependent peripheral device functional capabilities for the peripheral device and identification of the peripheral device form a peripheral device orchestrated device descriptor (ODD) for the peripheral device node accessible in a database by the hardware processor at the peripheral device workspace cloud orchestrator server.

10. The method of claim 8, wherein one of the plurality of peripheral device operational telemetry readings includes a notification that the anchor information handling system node is operating in a low-power mode.

11. The method of claim 8, wherein at least one of the received plurality of peripheral device operational telemetry readings associated with meeting the critical operational requirement of the anchor information handling system node or the peripheral device node is a specifically identified type of software application executing at the anchor information handling system node in the peripheral device workspace.

12. The method of claim 8, wherein the critical KPI is a maximum range for the peripheral device.

13. The method of claim 8, wherein the critical KPI is latency of a communication link.

14. The method of claim 8, wherein the second critical KPI is throughput of a communication link.

15. A peripheral device workspace cloud orchestrator executing at a cloud-based information handling system comprising:

a network interface device to receive a plurality of peripheral device operational telemetry readings describing a current usage pattern for an anchor information handling system node, a peripheral device node, and a plurality of available wireless communication protocols at an identified location for wireless communication between the anchor information handling system node and the peripheral device node;

a hardware processor executing code instructions for a peripheral device capability-aware communication protocol selection module to generate a plurality of wireless communication protocol-dependent peripheral device functional capabilities for the peripheral device node within a manifest of one or more peripheral device nodes that are operatively coupled to the anchor information handling system node at the identified location to form a defined peripheral device workspace identified by a peripheral device workspace identification value;

the hardware processor executing code instructions for the peripheral device capability-aware communication protocol selection module to identify a ranked list of a plurality of most critical key performance indicators (KPIs) to meet a critical operational requirement of the peripheral device node when operatively coupled the anchor information handling system node that are associated with at least one of the received plurality of peripheral device operational telemetry readings and select a selected communication protocol to operatively couple the anchor information handling system node and the peripheral device node based on the ranked list of the plurality of most critical KPIs; and the hardware processor to execute code instructions of the peripheral device workspace cloud orchestrator to instruct the anchor information handling system node to operatively couple to the peripheral device using the selected communication protocol having a best index value of communication protocol-dependent peripheral device functional capabilities to meet the ranked list of the plurality of most critical KPIs.

16. The peripheral device workspace cloud orchestrator executing at a cloud-based information handling system of claim 15, wherein the plurality of wireless communication protocol-dependent peripheral device functional capabilities for the peripheral device node and an identification of the peripheral device node are associated with a peripheral device orchestrated device descriptor (ODD) for the peripheral device node stored at a database of the cloud-based information handling system.

17. The peripheral device workspace cloud orchestrator executing at a cloud-based information handling system of claim 15, wherein the second critical KPI is a received signal strength indicator (RSSI).

18. The peripheral device workspace cloud orchestrator executing at a cloud-based information handling system of claim 15, wherein at least one of the received plurality of peripheral device operational telemetry readings associated with at least one of the plurality of most critical KPIs is a specifically identified type of software application executing at the anchor information handling system node in the peripheral device workspace.

19. The peripheral device workspace cloud orchestrator executing at a cloud-based information handling system of claim 15, wherein at least one of the received plurality of peripheral device operational telemetry readings associated with at least one of the plurality of most critical KPIs is identification of one or more additional information handling system nodes that are also operatively coupled to the peripheral device node in the peripheral device workspace at the identified location.

20. The peripheral device workspace cloud orchestrator executing at a cloud-based information handling system of claim 15, wherein at least one of the received plurality of peripheral device operational telemetry readings associated with at least one of the plurality of most critical KPIs is indication of power levels and communication link conditions at the anchor information handling system node and peripheral device node within peripheral device workspace.

* * * * *